US012458249B2

(12) United States Patent
Yang

(10) Patent No.: US 12,458,249 B2
(45) Date of Patent: Nov. 4, 2025

(54) CELL THERAPY FOR PATIENTS

(71) Applicant: Demao Yang, Mountain View, CA (US)

(72) Inventor: Demao Yang, Mountain View, CA (US)

( * ) Notice: Subject to any disclaimer, the term of this patent is extended or adjusted under 35 U.S.C. 154(b) by 446 days.

(21) Appl. No.: 15/940,553

(22) Filed: Mar. 29, 2018

(65) Prior Publication Data
US 2019/0298766 A1 Oct. 3, 2019

(51) Int. Cl.
| A61B 5/145 | (2006.01) |
| A61K 40/10 | (2025.01) |
| A61K 40/22 | (2025.01) |
| A61K 40/41 | (2025.01) |
| A61P 3/10 | (2006.01) |
| A61P 5/48 | (2006.01) |
| C12N 5/0786 | (2010.01) |

(52) U.S. Cl.
CPC .............. *A61B 5/145* (2013.01); *A61K 40/10* (2025.01); *A61K 40/22* (2025.01); *A61K 40/412* (2025.01); *A61K 40/414* (2025.01); *A61K 40/416* (2025.01); *A61P 3/10* (2018.01); *A61P 5/48* (2018.01); *C12N 5/0645* (2013.01); *A61K 2239/31* (2023.05); *A61K 2239/38* (2023.05)

(58) Field of Classification Search
CPC ........ A61K 35/17; A61K 35/15; A61B 5/145; A61P 3/10; A61P 5/48; A61P 3/06; A61P 9/12; A61P 15/08; A61P 19/10; A61P 25/16; C12N 5/0645; C12N 2501/22; C12N 2501/2302
USPC ......................................................... 424/93.7
See application file for complete search history.

(56) References Cited

U.S. PATENT DOCUMENTS

| 5,525,232 | A | 6/1996 | Veiro et al. |
| 5,550,161 | A | 8/1996 | Green |
| 5,643,786 | A | 7/1997 | Cohen et al. |
| 5,766,920 | A | 6/1998 | Babbitt et al. |
| 6,033,661 | A | 3/2000 | Smith et al. |
| 6,203,787 | B1 | 3/2001 | Thompson et al. |
| 7,048,922 | B2 | 5/2006 | Yang |
| 7,332,158 | B2 | 2/2008 | Yang |
| 7,758,857 | B2 | 7/2010 | Yang |
| 2005/0112105 | A1 | 5/2005 | Yang |
| 2013/0315939 | A1* | 11/2013 | Horwitz et al. ....... A61K 35/17 424/184.1 |

FOREIGN PATENT DOCUMENTS

| CN | 101084001 A | 12/2007 |
| JP | 2008512454 | 4/2008 |
| JP | 2008512454 A | 4/2008 |
| WO | 91/02050 A1 | 2/1991 |
| WO | 9220649 | 11/1992 |
| WO | 9520649 | 3/1995 |
| WO | 9623060 | 8/1996 |
| WO | 9806823 | 2/1998 |
| WO | 9823060 | 5/1998 |
| WO | 00/66158 A2 | 11/2000 |
| WO | 0162092 | 8/2001 |
| WO | 2004/056397 A1 | 7/2004 |
| WO | 2006/127152 A2 | 11/2006 |

OTHER PUBLICATIONS

Wang et al. "Clinical efficacy of autologous stem cell transplantation for the treatment of patients with type 2 diabetes mellitus: a meta-analysis." Cytotherapy 17.7 (2015): 956-968. (Year: 2015).*
Czerniecki et al. "Calcium ionophore-treated peripheral blood monocytes and dendritic cells rapidly display characteristics of activated dendritic cells." The Journal of Immunology 159.8 (1997): 3823-3837. (Year: 1997).*
Nishimura et al. "Adipose tissue inflammation in obesity and metabolic syndrome." Discovery medicine (2009). (Year: 2009).*
Rugge, Bruin, et al. "Screening and treatment of subclinical hypothyroidism or hyperthyroidism." (2011).• Rugge, Bruin, et al. "Screening and treatment of subclinical hypothyroidism or hyperthyroidism." (2011). (Year: 2011).*
Yamaza, Takayoshi, et al. "Pharmacologic stem cell based intervention as a new approach to osteoporosis treatment in rodents." PloS one 3.7 (2008): e2615. (Year: 2008).*
Bratland et al. "T cell responses to steroid cytochrome P450 21-hydroxylase in patients with autoimmune primary adrenal insufficiency." The Journal of Clinical Endocrinology & Metabolism 94.12 (2009): 5117-5124. (Year: 2009).*
Merriam-Webster. Definition of 'prescription'. (Year: 2021).*
Carp et al. "The autoimmune bases of infertility and pregnancy loss." Journal of autoimmunity 38.2-3 (2012): J266-J274 (Year: 2012).*
Saleh et al. "Prediction of congenital hypothyroidism based on initial screening thyroid-stimulating-hormone." BMC pediatrics 16.1 (2016): 1-5 (Year: 2016).*
Qui et al. "Chinese specialist consensus on treatment of customary pain in orthopedics." Orthopaedic Surgery 2.3 (2010): 169 (Year: 2010).*

(Continued)

*Primary Examiner* — Maria G Leavitt
*Assistant Examiner* — Alexander W Nicol
(74) *Attorney, Agent, or Firm* — Christensen, Fonder, Dardi & Herbert PLLC; Peter S. Dardi; Elizabeth A. Gallo

(57) ABSTRACT

Materials and methods of treating a patient with type 2 diabetes mellitus, metabolic syndrome, obesity, infertility, high blood pressure, hyperthyroidism, and hypothyroidism, hyperlipidaemia, osteoporosis, osteoarthritis, hypoadrenalism, polycystic ovary syndrome, or Parkinson's disease comprising administering a therapeutically effective amount of ex vivo cultured activated peripheral blood mononuclear cells (PBMCs) to the patient. The ex vivo cultured activated cells are activated and cultured in a presence of a cytokine and may be autologous or allogeneic relative to the patient.

6 Claims, 10 Drawing Sheets

(56) References Cited

OTHER PUBLICATIONS

Bayram et al. "Using an electrocautery strategy or recombinant follicle stimulating hormone to induce ovulation in polycystic ovary syndrome: randomized controlled trial." Bmj 328.7433 (2004): 192 (Year: 2004).*
Ruzicka et al. "Tests of manual dexterity and speed in Parkinson's disease: Not all measure the same." Parkinsonism & related disorders 28 (2016): 118-123 (Year: 2016).*
Little et al. "Thyroid disorders. Part II: hypothyroidism and thyroiditis." Oral Surgery, Oral Medicine, Oral Pathology, Oral Radiology, and Endodontology 102.2 (2006): 148-153 (Year: 2006).*
Petríková et al. "Polycystic ovary syndrome and autoimmunity." European Journal of Internal Medicine 21.5 (2010): 369-371 (Year: 2010).*
Yamaga, et al. "Enhanced chondrocyte destruction by lymphokine-activated killer cells. possible role in rheumatoid arthritis." Arthritis & Rheumatism: Official Journal of the American College of Rheumatology 36.4 (1993): 500-513 (Year: 1993).*
Armitage, "Emerging Applications of Recombinant Human Granulocyte-Macrophage Colony-Stimulating Factor", Blood, 92(12); 4491-4508, Dec. 15, 1998.
Bagby, "Production of Multi Lineage Growth Factors by Hematopoietic Stromal Cells: An Intercellular Regulatory Network Involving Mononuclear Phagocytes and Interleukin-1," Blood Cells, 13:147-159, 1987.
Bedrosian et al., "Granulocyte-Macrophage Colony-Stimulating Factor, Interleukin-2, and Interleukin-12 Synergize With Calcium Ionophore to Enhance Dendritic Cell Function," Journal of Immunotheropy, 23(3): 311-320, May-Jun. 2000.
Brugger et al., Ex Vivo Expansion of Enriched Peripheral Blood CD34+ Progenitor Cells by Stem Cell Factor, Interleukin-1beta, IL-6, IL-3, Interferon-gamma, and Erythropoietin, Blood, 2579-2584, 1993.
Calbiochem Catalog. 2000-2001. "Inophores", pp. 1, 91, 208, 262, 310, 369, 403, 412, 483, 486, 520, 554, 912.
Cesario et al., "Calcium and the Production of Interferon by Human Peripheral Blood Mononuclear Cells", Journal of Interferon Research, 8:783-792 (1988).
Chen et al., Ex Vivo Immunotherapy for Patients with Benzene-induced Aplastic Anemia, J. Hematotherapy and Stem Cell Research, 12(5): 505-514, 2003.
Chen et al., A Novel Ex Vivo Immunotherapy for Some Hematopietic and Blood Deficient Disorders. Blood 108: Abstract 4218. 2006.
Chopra et al., "Interleukin 2, Interleukin 2 Receptor, and Interferon-yamma Synthesis and mNRA Expression in Phorbol Myristate Acetate and Calcium Ionophore A23187-Simulated T Cell From Elderly Humans," Clinical Immunology and Immunopathology, 53: 297-308, Nov. 1989.
Czerniecki et al., "Calcium Ionophore-Treated Peripheral Blood Monocytes and Dendritic Cells Rapidly Display Characteristics of Activated Dentritic Cells," Journal of Immunology, 159(8):3823-3837, XP-001153936, Oct. 15, 1997.
Dufour et al., "TNF-α and IFN-γ are overexpressed in the bone marrow of Fanconi anemia patients and TNF-α suppresses erythropoiesis in vitro", Blood, 102(6):2053-2059 (Sep. 15, 2003).
Elgert, Immunology, Understanding the Immune System. New York: Wiley-Liss, Inc. 1996; pp. 24-26.
Ettinghausen et al., "Hematologic Effects of Immunotherapy With Lymphokine-Activated Killer Cells and Recombinant Interleukin-2 in Cancer Patients," Blood, 69(6):1654-1660, Jun. 1987.
Faries et al., "Calcium Signaling inhibits interleukin-12 production and activates CD83+ dendritic cells that induce Th2 cell development," Blood, 98(8):2489-2497, XP-002249512, Oct. 15, 2001.
Ferrara et al., "Graft-Versus-Host Disease," The New England Journal of Medicine, Mechanisms of Disease, 324(10): 667-674, Mar. 7, 1991.
Fibbe et al., "Biology of IL-8-Induced Stem Cell Mobilization", Annuals New York Academy of Sciences, Apr. 30, 1999;872:71-82.
Fibbe et al., "Human Fibroblasts Produce Granulocyte-CSF, Macrophage-CSF, and Granulocyte-Macrophage-CSF Following Stimulation by Interleukin-1 and Poly(RI).Poly(rC)," Blood, 72(3): 860-866, Sep. 1988.
Fujimori et al., "Effect of Lymphokine-Activated Killer Cell Fraction on the Development of Human Hematopoietic Progenitor Cells," Cancer Res, 48(3): 534-538, Feb. 1, 1988 (abstract only).
Ganser et al., "Effect of Recombinant Human Interleukin-3 in Patients With Normal Hematopoiesis and in Patients With Bone Marrow Failure," Blood, 6(4) 666-676, Aug. 15, 1990.
Gong et al., Ex Vivo Activated Immune Cells Promote Survival and Stimulate Multilineage Hematopoietic Recovery In Myelosuppressed Mice. J. Immunotherap 28: 420-425. 2005.
Hestdal et al., "In Vivo Effect of Interleukin-1α on Hematopoiesis: role of colony-Stimulating Factor Receptor Modulation", Blood, 80(10); 2486-2494, 1992.
Kolber et al., "Fluorescence Study of the Divalent Cation-Transport Mechanism of Ionophore A23187 in Phospholipid Membranes," Biophysical Society, 36: 369-391, Nov. 1981.
Rodriguez et al., "Regulation of Apoptosis in Interleukin-3-Dependent Hemopoietic Cells by Interleukin-3 and Calcium," The EMBO Journal, 9: 2997-3002, 1990.
Roros et al., "Calcium ionophore and cytokine treatment of human peripheral blood myeloid cells produces dendritic cells with an enhanced abaility to sensitize autologous CD8+ T cells to tumor antigens in a single culture stimulation," Proceedings of the annual meeting of the American Association for Cancer Research, New York, NY, 38: 631, XP-001018920, Apr. 12, 1997.
Sigma Chemical Company Catalog. "Ionophres", pp. 587-589, 1995.
Waclavicek et al., "Calcium Ionophore: A Single Reagent for the Differentiation of Primary Human Acute Myelogenous Leukaema Cells Towards Dendritic Cells," Brit. J. Haematol, 114(2): 466-473. 2001.
Westers et al., "A23187/IL-4 Cultural Leukemic Dendritic Cells Stimulate Autologous T Cell-Mediated Apoptosis of Acute Myeloid Leukemic Blasts," Blood, 98(11): Part 1, pp. 121a, XP-009014739, Nov. 16, 2001.
World Health Organization "Use of Glycated Haemoglobin", WHO/NMH/CHP/CPM/11.1 (2011).

* cited by examiner

Table 1. Characteristics of the patients at baseline.

| Patient no. | Age | Sex | Medications | Di-sease Duration (y) | Glycated Haemoglobin (%) | Symptoms | | | Plasma Lipids | |
|---|---|---|---|---|---|---|---|---|---|---|
| | | | | | | Blurred vision | Nocturia frequency | Unquenchable thirst | Cholesterol (mmol/L) | Triglyceride (mmol/L) |
| 1 | 52 | M | None | 1 | 13.3 | N | 3 | Y | 4.3 | 5.8 |
| 2 | 63 | M | None | 3 | 7.9 | N | 0 | N | 7.5 | 2.6 |
| 3 | 70 | M | None | 1 | 8.4 | N | 0 | N | 4.5 | 4.4 |
| 4 | 79 | M | None | 4 | 8.2 | Y | 0 | Y | 4.9 | 0.7 |
| 5 | 65 | M | None | 20 | 7.9 | Y | 2 | N | 6.8 | 1.7 |
| 6 | 70 | M | Insulin aspart (34U/d) | 21 | 11 | N | 2 | Y | 3.6 | 0.5 |
| 7 | 61 | M | Insulin aspart (30U/d) | 14 | 9.5 | Y | 0 | Y | 5.7 | 1.1 |
| 8 | 49 | M | Insulin aspart (25U/d) | 9 | 11.0 | Y | 2 | Y | 2.8 | 2.3 |
| 9 | 50 | M | Insulin aspart (42U/d) | 10 | 12.2 | Y | 3 | Y | 5.0 | 1.3 |
| 10 | 55 | F | Metformin (250mg, t.i.d.) | 5 | 8.7 | N | 0 | N | 6.7 | 4.9 |
| 11 | 63 | F | Metformin (250 mg, t.i.d.) Gliclazide (80 mg, b.i.d.) | 20 | 11.0 | Y | 0 | Y | 5.9 | 1.8 |

FIG. 1A

| | | | | | | | | | |
|---|---|---|---|---|---|---|---|---|---|
| 12 | 69 | M | Gliclazide (30 mg, q.d.); acarbose (50 mg, t.i.d.) | 15 | 9.3 | N | 0 | Y | 6.3 | 1.7 |
| 13 | 66 | M | Glipizide (5 mg, q.d.); acarbose (50 mg, t.i.d.) | 6 | 11.2 | Y | 0 | Y | 3.4 | 1.0 |
| 14 | 57 | M | Glipizide (5 mg, q.d.); acarbose (50 mg, t.i.d.) | 6 | 7.8 | Y | 1 | Y | 4.1 | 1.0 |
| 15 | 59 | F | Metformin (250 mg, t.i.d.) | 16 | 7.5 | N | 1 | Y | 4.6 | 2.2 |
| 16 | 60 | M | Metformin (250 mg, t.i.d.) | 9 | 11.9 | Y | 1 | Y | 5.2 | 1.6 |
| 17 | 51 | F | Acarbose (25 mg, b.i.d.) | 1 | 7.5 | N | 1 | Y | 4.0 | 0.8 |
| 18 | 69 | M | Acarbose(50 mg, t.i.d.) | 1 | 7.0 | N | 2 | N | 2.4 | 0.6 |
| 19 | 63 | M | Metformin (150 mg, t.i.d.); insulin aspart (18U/d) | 15 | 7.0 | Y | 3 | Y | 4.8 | 1.4 |
| 20 | 27 | M | None | 4 | 11.5 | Y | 2 | Y | 6.6 | 1.9 |
| 21 | 35 | F | None | 5 | 7.8 | N | 0~1 | N | 6.5 | 4.2 |
| 22 | 36 | M | None | 5 | 7.2 | N | 0~1 | N | 6.2 | 3.8 |
| 23 | 46 | F | None | 8 | 8.5 | N | 2 | Y | 5.8 | 2.5 |
| 24 | 39 | M | Metformin (250 mg, t.i.d.) | 11 | 7.0 | Y | 3 | Y | 4.7 | 1.0 |
| 25 | 42 | M | Metformin (250 mg, t.i.d.) | 12 | 6.5 | N | 0 | N | 5.6 | 0.5 | t.i.d.=three times daily; b.i.d=two times daily; q.d.=once daily.

FIG. 1B

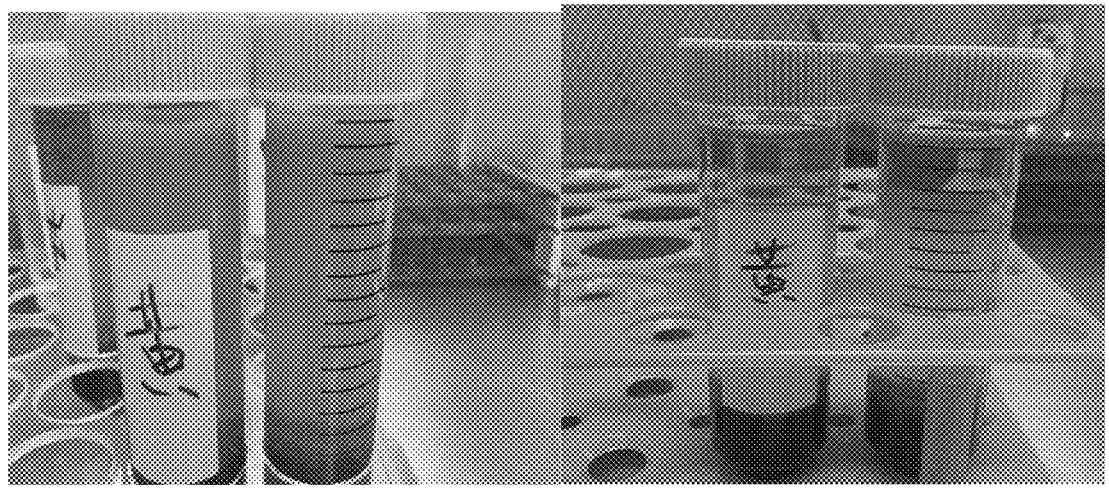
FIG. 4E                    FIG. 4F
 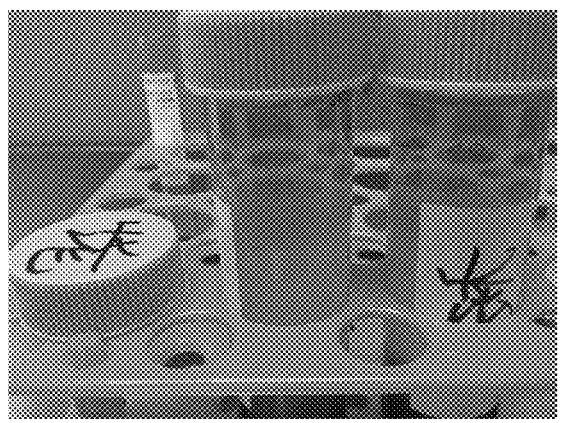
FIG. 4G                    FIG. 4H

CELL THERAPY FOR PATIENTS

TECHNICAL FIELD

The technical field relates to a cell therapy treatment of type 2 diabetes mellitus and other conditions, and includes administration of ex vivo cultured cells to treat diabetes and other conditions.

BACKGROUND

Type 2 diabetes mellitus is rapidly becoming a major global health problem. Because of the complexity associated with the underlying causes of the disease, effective prevention has not been successful, and disease-related drug treatment has also shown limited success [1-4]. Patients with diabetes have a 2-fold greater risk of developing and dying of cardiovascular diseases, as compared with those without diabetes, and far higher rates of requirement for kidney dialysis than the general population [5-7]. Deteriorations in glucose and lipid homeostasis are believed to cause arteriosclerosis, which eventually leads to the majority of severe complications associated with diabetes [8, 9]. Therefore, new therapies capable of maintaining glucose and lipid homeostasis are critical to reducing mortality and morbidity associated with type 2 diabetes mellitus.

SUMMARY

An embodiment of the invention is a method of treating a patient with type 2 diabetes mellitus, metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease, or a combination thereof, comprising administering a therapeutically effective amount of ex vivo cultured activated peripheral blood mononuclear cells (PBMCs) to a patient with type 2 diabetes mellitus, metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease, or a combination thereof. The ex vivo cultured activated cells may be autologous to the patient and are activated and cultured in a presence of a cytokine.

An embodiment of the invention is ex vivo cultured activated blood cells for treatment of type 2 diabetes mellitus, metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease, or a combination thereof, the ex vivo cultured blood cells being prepared by a process comprising culturing peripheral blood mononuclear cells (PBMCs) in a presence of a cytokine to activate the PBMCs.

An embodiment of the invention is use of ex vivo cultured activated blood cells for manufacture of a medicament for treating type 2 diabetes mellitus, metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease, or a combination thereof, the ex vivo cultured blood cells being prepared by a process comprising culturing peripheral blood mononuclear cells (PBMCs) in a presence of a cytokine to activate the PBMCs.

All of the embodiments above may include the case wherein the cytokine is selected from the group consisting of Interleukin-2 (IL-2), granulocyte-macrophage colony stimulating factor (GM-CSF), and combinations thereof. A calcium ionophore and/or serum may be used in the culture. Administration of the PBMCs according to the inventive methods reduces a glycated haemoglobin level of the patient. The reduction may be measured relative to a baseline established prior to the administration. Administration of the PBMCs reduces a triglyceride level of the patient, particularly in patients with a pre-treatment triglyceride level that is above a range normal to a patient in light of the patient's age and gender. The reduction may be measured relative to a baseline established prior to the administration of the cells.

All of the embodiments above may include culturing PBMCs comprising isolating the PBMCs from the patient, which is most easily accomplished by use of a blood sample. The PBMCs may be autologous or allogeneic. The culturing may comprise determining a concentration of cytokine, e.g. IL-2 and GM-CSF, to use in culture of the cells based on a proliferation assay for the PBMCs, wherein the PBMCs are cultured at the determined concentration of the cytokine. The cells may be cultured in a medium that contains serum or under serum-free conditions.

Embodiments for administering PBMCs may include repeating administration of PBMCs in a set of doses over one or more a periods of time optionally separated by an interval between the sets of doses. For instance, a set of doses administered in 2-20 doses over a period of time ranging from 2-100 days; artisans will immediately appreciate that all ranges and values between the explicitly stated bounds are contemplated, e.g. 2, 4, 8, 14, 15, 16, 17, 18, 19, 20, 22, 25, 30, 31, 40, 50, 60, 70, 80, 90, 100 days and 2, 3, 4, 5, 6, 7, 8, 9, 10, 11, 12, 13, 14, 15, 16, 18, 20 doses. Each dose within the period of time may be separated by one or more days, e.g., 1-7, 1, 2, 3, 4, 5, 6, or 7 days. An interval between the sets of doses may be, for instance, from 1 to 26 weeks, e.g., 1, 2, 3, 4, 5, 6, 7, 8, 9, 10, 11, 12, 14, 16, 20, 23, 26 weeks, or 1, 2, 3, 4, 5, or 6 months. The treatment may be repeated as indicated by testing of the patient and a greater amount of time may pass between treatments. Referring to the Examples, an example is a set of 8 doses administered in a period of time that is 15 days separated by 1 day between the doses, followed by a second set of doses separated by an interval of two months. Note that about 48 hours passes between a dose on day 1 and day 3 and the doses are said to be separated by 1 day. A dose of the PBMCs may range from, for instance, $1 \times 10^5$ to $2 \times 10^8$ cells; artisans will immediately appreciate that all ranges and values between the explicitly stated bounds are contemplated: $10^5$, $10^6$, $10^7$, $10^8$ and $2 \times 10^8$. The method of treatment may include providing a first treatment wherein the glycated haemoglobin level decreases relative to a pre-treatment level after the administration of the PBMCs and further comprising providing a further treatment that comprises administration of cultured, activated PBMCs after a subsequent increase in the glycated haemoglobin level.

The embodiments above may include one or more of: testing a glycaemic level in the patent before or after the administration of cultured, activated PBMCs, assessing the patient before administration of the PBMCs to determine that the patient has diabetes 2 mellitus, establishing a baseline glycaemic level and/or glycated haemoglobin level before administration of the PBMCs, measuring a glycated haemoglobin level of the patient before or after administration of the PBMCs., and measuring a triglyceride level and/or a cholesterol level of the patient after administration of the PBMCs. Patients may be assessed for the presence of one or more of metabolic syndrome, obesity, infertility, high blood pressure, hyperthyroidism, hypothyroidism, hyperlipidemia, osteoporosis, osteoarthritis, hypoadrenalism, polycystic ovary syndrome, and Parkinson's disease and a baseline suitable for the indicated disease may be chosen and established.

BRIEF DESCRIPTION OF THE DRAWINGS

FIG. 1A is Table 1 showing baseline characteristics of patients prior to therapy described in Example 1.

FIG. 1B is a continuation of the Table 1 of FIG. 1A.

FIGS. 4A-4H are photographs that depict plasma of a patients with hyperlipidaemia taken before (4A, 4C, 4E, 4G) and after (4B, 4D, 4F, 4H) therapy with 4B, 4D, 4F, 4H being from the patients plasma samples of 4A, 4C, 4E, 4G, respectively.

DETAILED DESCRIPTION OF THE DRAWINGS

Figure 2:
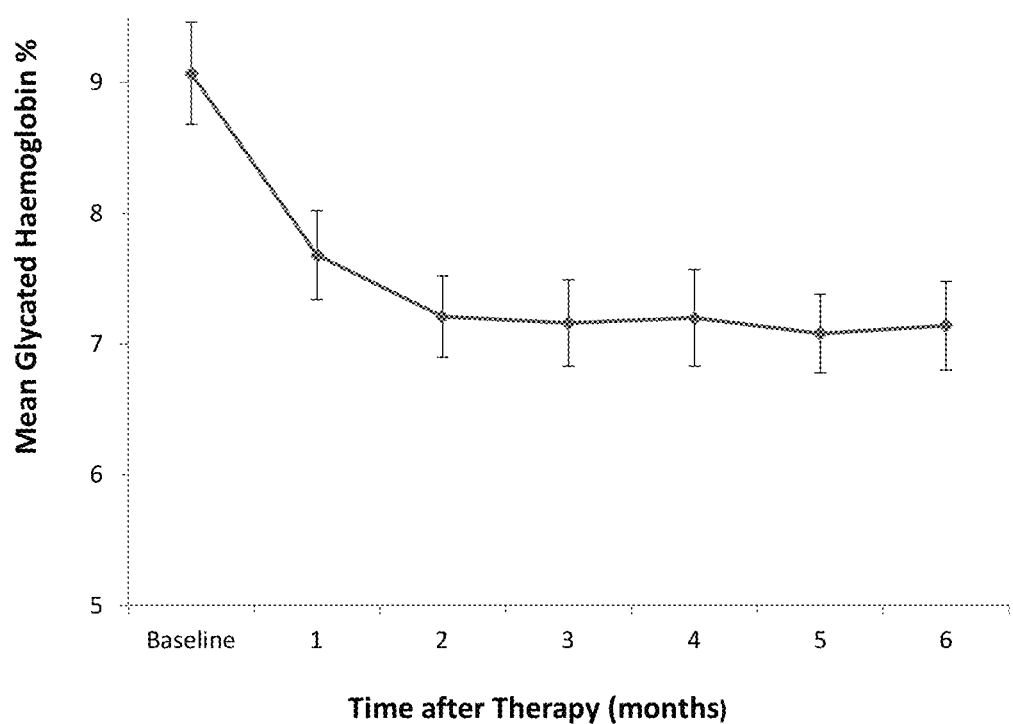
FIG. 2 is a plot of data that shows the baseline of, and changes to, glycated haemoglobin levels and the statistics of actual mean values of glycated haemoglobin before and after therapy.

Herein, are disclosed ex vivo cell culture techniques are effective for treatment of patients that have type 2 diabetes mellitus. Data collected from animals is presented that indicate mechanisms by which the diabetes was effectively treated. These mechanisms are more broadly applicable to treat further diseases that involve a dysregulation of the hypothalamus or pituitary. Examples of the treatment of such diseases are further presented, including successful treatments of patients for hypothyroidism, infertility, osteoarthritis, polycystic ovary syndrome, and Parkinson's disease. Disease for treatment include diabetes type 2, metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease, or a combination thereof.

Within the brain, a number of anatomical regions are recognised to play a role in metabolic homeostasis [14], however, the hypothalamus in particular is critical in sensing and integrating signals from the periphery and effecting appropriate changes to maintain energy homeostasis. A number of peripheral factors including leptin, glucose, insulin, thyroid hormones, amino acid and fibroblast grow factors have been shown capable of influencing hypothalamus [15] to maintain energy homeostasis. Nonetheless, it appears that there are no successful therapies targeting the hypothalamic mechanism clinically available in for treatment of metabolic diseases, including type 2 diabetes.

The hypothalamus-pituitary gland axis is implicated in the neuroendocrine activities in all vertebrates. The endocrine system is the collection of glands of an organism that secrete hormones directly into the circulatory system to be carried towards distant target organs. The major endocrine glands include the pineal gland, pituitary gland, pancreas, ovaries, testes, thyroid gland, parathyroid gland, hypothalamus, gastrointestinal tract and adrenal glands. The hypothalamus and pituitary gland are tightly integrated. Dysfunction of, or an imbalance at, the hypothalamus will impact the responsiveness and normal functioning of the pituitary. Hypothalamic dysregulation may cause insufficient or inhibited signalling to the pituitary leading to deficiencies of hormones or other factors, for example, thyroid-stimulating hormone (TSH), follicle-stimulating hormone (FSH), luteinizing hormone, adrenocorticotropic hormone, beta-endorphin, and melanocyte-stimulating hormones.

Pro-opiomelanocortin (POMC) is an important precursor polypeptide the can be affected by pituitary and/or hypothalamus dysregulation. POMC is synthesized in the pituitary and gives rise to peptides with roles in pain and energy homeostasis, melanocyte stimulation, and immune modulation. These include several distinct melanotropins, lipotropins, and endorphins that are contained within the adrenocorticotrophin and γ-lipotropin peptides. POMC is a source of peptides that include N-Terminal Peptide of Proopiomelanocortin (NPP, or pro-γ-MSH), α-Melanotropin (α-Melanocyte-Stimulating Hormone, or α-MSH), β-Melanotropin (β-MSH), γ-Melanotropin (γ-MSH), δ-Melanocyte-Stimulating Hormone, Corticotropin (Adrenocorticotropic Hormone, (ACTH)), Corticotropin-like Intermediate Peptide (CLIP), β-Lipotropin (β-LPH), Gamma Lipotropin (γ-LPH), (β-Endorphin, and [Met] Enkephalin.

Numerous dysfunctions manifest as a result of hypothalamic and/or pituitary disease including disruptions in body temperature regulation, growth, weight, sodium and water balance, milk production, emotions, and sleep cycles. Diseases that can be treated by addressing these disruptions include treatment of type 2 diabetes, metabolic syndrome, obesity, infertility, high blood pressure, hyper and hypothyroidism, hyperlipidemia, osteoporosis, osteoarthritis, hypoadrenalism, polycystic ovary syndrome, and Parkinson's disease.

The animal models data described herein shows that ex vivo activated PBMCs, such as peripheral white blood cells or leukocytes, can stimulate the pituitary gland to make increased amounts of RNAs of multiple hormones, including five hormones are exclusively made by the pituitary gland. POMC was increased by about 3-fold, and is known to play a vital roles in metabolism and multiple biological processes. The effects between ex vivo activated PBMCs, such as white blood cells and/or leukocytes and pituitary gland were not previously known. The processes herein that provide for stimulation and/or or regulation of the hypothalamus and/or pituitary gland to treat their disordered functions were previously unknown and the effects of activated PBMCs on the brain, in particular the hypothalamus and pituitary gland were previously unknown.

Disclosed herein is a cell therapy method, processes for making the cells for use in treatment of diabetes, and results of its use in a phase I clinical human trial described in Example 1. A small amount of autologous peripheral mononuclear cells (PBMCs) were cultured in vitro and infused back to patient. Each patient received eight cell infusions within 4 weeks and was followed-up monthly for 6 months following therapy. The primary outcome measurements were changes in glycated haemoglobin levels, whereas other outcome measurements included changes in total cholesterol and triglyceride levels, diabetic symptoms of blurred vision, increased urination and thirst, as compared with pre-therapy base lines. Twenty-five patients with type 2 diabetes were enrolled in the study, with some exhibiting individual or combinations of concomitant medical conditions, including hypertriglyceridemia and hypercholesterolemia. The immunotherapy method was safe and well tolerated without major adverse events. It significantly lowered glycated haemoglobin and triglyceride levels and improved diabetic symptoms, including improvement of problems with blurred vision, increased urination and thirst.

The findings of this clinical study prompted a reconsideration the mechanism of immunotherapy performed with PBMCs as described for treatment of aplastic anaemia (AA). Without being bound to a particular theory, it is believed that the in vitro activated cells may directly or indirectly influence the central nervous system, hypothalamus-pituitary axes in particular, in favour of maintaining energy homeostasis.

As described in Example 2, comparative RNA sequencing (RNA-seq analysis) was performed to investigate changes of transcriptome in pituitary gland of normal rats in response to the immunotherapy. Pituitary gland was chosen because it is an important neuroendocrine organ physically connected to the hypothalamus, and can be removed easily without contamination of surrounding tissues. Sequence quality, nucleotide composition bias, PCR bias and GC bias, sequencing saturation, mapped reads distribution, coverage uniformity, strand specificity and transcript level RNA integrity were checked and the results suggested that there were no obvious detectable biases in the sequence data. Alignment statistics indicated data were of high quality and uniform, and provided sufficient sequencing depth to pursue differential expression testing between control and immunotherapy-treated groups.

RNA-seq identified 291 differentially expressed genes (DEGs) in response to the immunotherapy method. GO and KEGG enrichment pathway analyses mapped these DEGs heavily to metabolism. Quantitative PCR (qPCR) analysis was also performed for six hormone genes of pituitary gland, plus a few selected DEGs that play important biological roles to validate and compare with RNA-seq results. The immunotherapy method induced higher gene expressions of most pituitary gland hormones, especially proopiomelanocortin, as well as those of selected DEGs. The results point to a theory of operation, to which the invention is not bound, that the immune system effectively influences the central nervous system and helps maintain energy homeostasis, which is further evidenced in Examples 1 and 3-7.

As described in Example 3, treatment was effective for hypothyroidism. The hypothalamic-pituitary-thyroid axis is involved in maintaining thyroid hormone levels within normal limits. Production of TSH by the anterior pituitary gland is stimulated in turn by thyrotropin-releasing hormone (TRH), released from the hypothalamus. Thyroxine decreases TSH and TRH levels through a negative feedback. Since the treatment restored regulation of the hypothalamic-pituitary axis, the activated cells are also useful to treat hyperthyroidism. Example 4 describes treatments of patients for infertility. Hypothalamic-pituitary dysregulation is a known cause of infertility and measurements of TSH levels are typically part of an evaluation of infertility problems. In general, it can be seen that dysregulation of TSH is treatable with the activated cells, including increasing or decreasing TSH levels and/or restoring TSH levels to within a normal range.

Three patients were treated for osteoarthritis with ex vivo cultured activated PBMCs (autologous or allogenic) as reported in Example 5. The hypothalamic-pituitary axis is implicated in the bodily management of pain through the adrenal glands and particularly in cortisol levels. All of the patients reported a decrease in pain as measured by a standard test before and after treatment. Accordingly the cells and methods reported herein are useful for patients that suffer from osteoarthritis or from osteoporosis.

A patient was treated for polycystic ovary syndrome with ex vivo cultured activated PBMCs as reported in Example 6. This syndrome is characterized by dysregulated endocrine functions and a dysregulation of the hypothalamic-pituitary axis is indicated. The ratio of luteinizing hormone (LH) and follicle-stimulating hormone (FSH) were reduced by the therapy, indicating improvements. The cells and methods herein are useful for treating polycystic ovary syndrome and a ratio of LH to FSH can be improved thereby, meaning the ratio can be moved to a level that is closer to normal relative to levels before the treatment.

A patient was treated for Parkinson's Disease with ex vivo cultured activated PBMCs as reported in Example 7. Parkinson's Disease typically creates imbalances in hypothalamic function that contribute to many of the symptoms of this disease. Accordingly, an improved regulation of the hypothalamic function is useful to treat this disease. Treatments of this patient resulted in improved dexterity as measured by an objective test and the patient also reported improvements in other functions. Treatments with the methods and cells reported herein are effective for treating patients that have Parkinson's Disease.

As supported by all of the Examples, hypoadrenalism, metabolic syndrome, obesity, hyperlipidemia, and high blood pressure can be treated with the activated ex vivo cultured cells and methods herein by way of restoring regulation of the pituitary-hypothalamic axis. Hypoadrenalism is directed connectable to dysregulation of the hypothalamic-pituitary axis, and typically involved underproduction of steroid hormones, e.g. cortisol and/or aldosterone. Metabolic syndrome is characterized by having at least three of: abdominal obesity, high blood pressure, high blood sugar, high serum triglycerides and low high-density lipoprotein (HDL) levels. A dysregulated hypothalamus is one known cause for obesity and energy regulation and homeostatic are implicated in obesity. The hypothalamus tuberal region is known to be involved in blood pressure regulation. The hypothalamic-pituitary axis is implicated in these conditions.

Described herein are materials and methods using blood cells activated in culture for treating type 2 diabetes mellitus, metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease, or a combination thereof. The term cultured refers to a process of culturing cells, such as is customary in these arts. Culturing relates to creating conditions for cells that activate a cell's cellular machinery to produce a desired effect. Thus incubating a cell with certain factors to activate the cell is a culturing process, as is expanding cells ex vivo to increase their number. In contrast, a process of preserving or processing cells, e.g., by freezing or isolation or a particular type, is merely storage or sorting of the cells.

The term "therapeutically effective amount" is a sufficient quantity of the activated blood cells to effect a statistically significant improvement in a symptom or baseline factor indicative of the disease being treated. Levels of factors in blood pertinent to type 2 diabetes mellitus include glycated haemoglobin. Glycated haemoglobin levels are advantageous to measure since they reflect an effect that takes place over weeks or months as opposed to shorter-term effects. In diabetes patients with hypertriglyceridemia, plasma triglyceride levels are pertinent. Example 1 describes a reduction of a pre-treatment baseline level of glycated haemoglobin from about 9.1 to about 7.1, which is a reduction of about 20%. Moreover, the glycated haemoglobin levels were steady after about 2 months. The mean triglyceride levels dropped from about 3.1 to about 2.1, which is a reduction of about 30%. As shown in the Examples, improvements of parameters were statistically significant.

Embodiments include using ex vivo cultured activated peripheral blood mononuclear cells (PBMCs) for lowering a level of glycated haemoglobin and/or plasma triglyceride in a type 2 diabetes mellitus patient, relative to a baseline level in the patient prior to treatment, by an amount from 1-50%, artisans will immediately appreciate that all ranges and values between the explicitly stated bounds are contemplated, with, e.g., any of the following being available as an upper or lower limit: 5, 7, 10, 12, 15, 20, 25, 30, 35, 40, 45, 50%. Embodiments include lowering a level of glycated haemoglobin and/or plasma triglyceride to establish a new level after a first period of time for a second period of time, e.g., 5-50% lower including all ranges and values therebetween. Further, a baseline relative to a new level established during a second period of time after treatment may be established for other treatments such as treatments of metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease, or a combination thereof, The first period of time and the second period of time may be independently chosen to be from 1-12 months, e.g., 1, 2, 3, 4, 5, 6, 7, 8, 9, 10, 11, or 12 months. Artisans are accustomed to establishing a baseline level of a factor of the patient. A baseline in medicine is information found at the beginning of a study or other initial known value which is used for comparison with later data. The concept of a baseline is used in the common practice of medicine in order to establish a relative rather than absolute meaning to data.

Certain embodiments are directed to the culturing of blood cells, and particularly peripheral blood mononuclear cell (PBMCs). The isolation of PBMCs has been practiced since the 1960's using various techniques after it was pioneered by Boyum, see Boyum, A. (1964) Nature, 204, 793-794, and Boyum, A. (1967) Scan, J. Lab. Clin. Invest Suppl. Some embodiments using PBMCs are advantageous because there is no need to isolate only one cell type. Thus complicated procedures for capturing essentially only one cell type may be avoided. Certain embodiments are directed to blood cultures of at least 2-20 blood cell types; ordinary artisans will recognize that all values within this explicit range are contemplated and described. Leukocytes and/or monocytes are particularly useful in treatments using cultured PBMCs and may be isolated from PBMCs or the PBMCs may be further purified to obtain an enriched fraction of leukocytes and/or monocytes. Embodiments that comprise culturing and administering PBMCs may be performed by culturing and administering leukocytes and/or monocytes.

A protocol for activating blood cells via ex vivo culture includes obtaining a blood sample (e.g., 10-100 ml) from the patient, separating PBMCs from the blood sample, and culturing the separated PBMCs. The blood cells may be separated from blood sera by protocols such as by centrifugation. The separated blood cells are then cultured under sterile conditions in a cell culture medium with one or more of a cytokine (to include cell stimulating factors) and a calcium ionophore.

Cytokines useful for activating the blood cells include interleukin-2 (IL-2) and granulocyte-macrophage colony stimulating factor (GM-CSF). IL-2 is a hormone-like substance released by stimulated T lymphocytes. IL-2 causes activation and differentiation of other T lymphocytes independently of antigen. IL-2 stimulates the growth of certain disease-fighting blood cells in the immune system and is secreted by Th1 CD4 cells to stimulate CD8 cytotoxic T lymphocytes. IL-2 also increases the proliferation and maturation of CD4 cells themselves. GM-CSF is an acidic glycoprotein of 23 kD with internal disulfide bonds. GM-CSF is produced in response to a number of inflammatory mediators by mesenchymal cells present in the hemopoietic environment and at peripheral sites of inflammation. GM-CSF stimulates the production of neutrophilic granulocytes, macrophages, and mixed granulocyte-macrophage colonies from bone marrow cells and can stimulate the formation of eosinophil colonies from fetal liver progenitor cells. The cell culture concentrations of cytokines, and IL-2 and GM-CSF, may be established with a suitable assay for determining concentrations that activate the PBMCs. For instance, a range of concentrations may be tested and a cell proliferation assay used to determine what concentrations cause the most proliferation of cells. These concentrations may then be used in culturing of the PBMCs to activate them.

Useful concentrations of IL-2 were observed to be 100 to 2000 international units/ml (IU/ml), with 500-1000 being typical; contemplated endpoints and ranges for IL-2 include 100, 200, 400, 600, 800, 1000, 1200, 1500, 1800, and 2000 IU/ml. Useful concentrations of GM-CSF were observed to be from 0.02 to 0.2 µg/ml, with 0.08 to 0.15 µg/ml being typical; contemplated endpoints and ranges for GM-CSF include 0.02, 0.04, 0.06, 0.08, 0.1, 0.12, 0.14, 0.16, 0.18 and 0.2 µg/ml.

Calcium ionophores are known. These are helpful to use in combination with IL-2 and GM-CSF to obtain optimal results but are not necessary. Ionophores are calcium or other cation specific reagents (such as polypeptrates) which can traverse a lipid bilayer and a lipid soluble. There are two classes of ionophores: carriers and channel formers. Carriers, like valinomycin, form cage-like structures around specific ions, diffusing freely through the hydrophobic regions of the bilayer. Channel formers, like gramicidin, form continuous aqueous pores through the bilayer, allowing ions to defuse therethrough. In addition to the foregoing, suitable ionophores for the present protocol may include A23187 (calcimycin), ionomycin, geldanamycin, monensin (Na-salt), nystatin, polymyxin-B sulfate, and rapamycin. It is believed that carriers, such as A23187, accumulate calcium cations in response to pH gradients. A23187 possesses a dissociating carboxylic acid group and catalyzes an electrically neutral exchange of protons for other cations across the membrane (Hyono et al., BBA 389, 34-46 (1985): Kolber and Haynes, Biophysics Journal, 36, 369-391 (1981); Hunt and Jones, Biosci. Rep., 2, 921-928 (1982)). Two molecules of A23187 are present as carboxylate anions, and are thus available to carry to protons, or equivalents, back across the membrane after releasing the transported divalent cation. If present, calcium ionophores may be present in concentrations between about 1 and 10,000 ng/m; artisans will immediately appreciate that all ranges and values between the explicitly stated bounds are contemplated, such as 1, 100. 500, 1000, 2000, 4000, 5000, 6000, 7000, 8000, 10000, which includes ranges 1 to 1000 ng/ml, or 10 to 500 ng/ml. Alternately, ionophores may be present in an effective concentration. An effective concentration of ionophores is any concentration at which blood cells are activated, but not overactivated, by the present protocol.

Suitable culture media useful in ex vivo activation provide essential nutrients for blood cells. These media generally comprise, for example, inorganic salts, amino acids, vitamins, and other compounds all in forms which can be directly utilized by blood cells. By way of illustration and not limitation, one suitable medium is RPMI 1640. However, other media, such as serum-free media AIM-V, will support blood cells in culture may be suitable as well. The medium may be supplemented with a mammalian serum, e.g., fetal calf serum at levels between about 0.1 and 50% of the cell culture medium by volume; artisans will immediately appreciate that all ranges and values between the explicitly stated bounds are contemplated: 0.1, 0.5, 1, 5, 10, 15, 20, 25, 30, 35, 40, 45, 50, as a percent of the cell culture medium by volume. Cell culture media such as RPMI 1640 are well known and the artisan can readily select a suitable culture medium.

The duration of culturing the cells may similarly be a suitable amount of time to activate the cells, for instance as measured by cell proliferation. Times for culture of the separated blood cells may be, for instance, greater than about 1 hour or between about 10 and 200 hours; artisans will immediately appreciate that all ranges and values between the explicitly stated bounds are contemplated, such as 1, 2, 5, 10, 24, 48, 72, 100, 120, 140, 150, 175, and 200 hours. Temperature of the cultures may be controlled appropriately, e.g., at a temperature in a range from 30-42° C.; artisans will immediately appreciate that all ranges and values between the explicitly stated bounds are contemplated, e.g., 30, 32, 34, 37, 38, 39, 40, 42° C.

After being cultured, the activated blood cells may be washed (e.g., twice with sterile saline solution). Therapeutically effective amounts of the activated blood cells are then administered to patients. One acceptable method of administering the activated blood cells is intravenously.

The activated cells may be administered once or multiple administrations of activated cells may be used. For instance, 8 administrations were performed in a 4 week period for Example 1. Blood samples can be drawn from patients repeatedly before, during, or after an initial treatment so that additional activated blood cells can be obtained for further administrations. The cells may be collected and cultured prior to each administration or groups of cultured cells may saved, in whole or in part, for future administrations. The total time required for a treatment (e.g., administering a dose of the activated blood cells) may depend on the amount of activated blood cells available and patient response.

The activation compounds, such as one or more cytokines and/or one or more ionophore, can be mixed with an appropriate cell culture medium or a portion thereof for distribution. In alternative embodiments, one or more activation compounds can be packaged along with a cell culture medium or portions thereof for shipping. Similarly, a desired combination of activation compounds, such as one or more cytokines and one or more ionophores, can be packaged together for shipping, either mixed or in separate compartments. In any of these embodiments, the medium and/or activation compounds can be combined with any remaining medium components and/or activation compounds to form the desired medium for culturing cells under conditions to activate the cells. Also, in any of these embodiments, the compositions that are packaged together can include, for example, instructions for completing the cell culture medium with activation properties and/or instructions for performing the cell culturing.

The cell culturing can be performed at the facility that is treating the patient or the cell culturing to activate the cells can be performed at a remote location. In either case, the activated cells can be administered after a short period of time after harvesting from the cell culture to ensure that the cells remain viable. Alternatively, the cells can be stored under conditions that maintain the cells in a viable condition. For example, the cells can be stored at liquid nitrogen temperatures with a cryoprotectant. The cells can be prepared, for example using known procedures, at appropriate times for administration to the patient. For example, the cells can be suspended in a buffered saline solution for administration to the patient. Other known carriers, for example, can be used for delivery of the cells. The trial reported in Example 1 used autologous human cells. Similar methods using PBMCs for treatment of AA were also successfully performed with allogeneic PBMCs. Accordingly, allogeneic cells may be used instead of autologous cells.

EXAMPLES

Example 1: Treatment of Patients with Ex Vivo Activated PBMCs

1. Patients

A total of 25 patients previously diagnosed with type 2 diabetes mellitus were enrolled in and completed the study. These included 19 males and six females, with a median disease history of 9 years (range: 1-21 years); the median age was 59 years (range: 27-79 years). The mean baseline glycated haemoglobin was 9.07±1.97% (range: 6.5-13.3%). Of the 25 patients, ten initially exhibited triglyceride levels >1.70 mmol/L (mean: 3.12±1.24 mmol/L; range: 1.70-4.86 mmol/L), 13 exhibited total cholesterol levels ≥5.20 mmol/L (mean: 6.35±0.52 mmol/L; range: 5.70-7.47 mmol/L), and 18 exhibited one or more diabetes-related symptoms of blurred vision (12; 48%), frequent trips to the bathroom (10; 40%; defined as two or more trips per night), and unquenchable thirst (16; 64%). Of the 25 patients, 16 (64%) initially took either one or a combination of glucose-lowering drugs, including insulin, gliclazide, metformin, and acarbose. The dosages of all medications were cut without exception at least by ≥50% throughout the study. The patients who initially exhibited hyperlipidaemia were not allowed to take any lipid-lowering drugs before, during, or after therapy.

Patient characteristics prior to therapy are summarized in Table 1 in FIG. 1. Of the 25 patients, 11 (44%) had a college education. No special advice concerning lifestyle, eating habits, or physical exercise was provided to the patients; however, they were strongly advised to avoid alcohol use. None of the patients practiced any specialized diet or exercise plans and maintained a similar lifestyle before, during, and after the study.

2. Safety and Administration 50 millilitres of vein blood was drawn from each patient and PBMCs were isolated, cultured and collected in laboratory before being administrated intravenously to the same patient. All patients received a total of 8 infusions within a period of 4 weeks.

Overall, treatment was well tolerated, with the most common side effects being headache (22; 88%), fatigue (20; 80%), fever between 37° C. and 38.5° C. (16; 64%), chills (16; 64%), and vomiting and diarrhoea (2; 8%), which were most often infusion-related and temporary, with most resolving without medication and within 24 h after cell infusion. No patients dropped out of the study due to side effects.

3. Primary Outcome

In this study, the mean glycated haemoglobin at pre-therapy baseline was 9.07±1.97%, and the mean reductions post-therapy were 1.39±1.05%, 1.86±1.44, 1.91±1.43, 1.87±1.54, 1.99±1.50, and 1.92±1.47% assessed monthly for 6 months, respectively (p<0.001). The changes of glycated haemoglobin levels and the statistics of actual mean values of glycated haemoglobin before and after therapy are shown in FIG. 2 and in Table 2.

TABLE 2

Changes in glycated haemoglobin

| | Baseline | Months after therapy | | | | | |
| --- | --- | --- | --- | --- | --- | --- | --- |
| | | 1 | 2 | 3 | 4 | 5 | 6 |
| Mean (%) | 9.07 | 7.68 | 7.21 | 7.16 | 7.20 | 7.08 | 7.14 |
| S.E.M. | 0.39 | 0.34 | 0.31 | 0.33 | 0.37 | 0.30 | 0.34 |
| Lower 95% CI | 8.26 | 7..00 | 6.58 | 6.50 | 6.44 | 6.45 | 6.44 |
| Upper 95% CI | 9.9 | 8.38 | 7.85 | 7.84 | 8.00 | 7.70 | 7.85 |
| P | | <0.001 | <0.001 | <0.001 | <0.001 | <0.001 | <0.001 |

S.E.M. = Standard Error of the Mean.
CI = Confidence Interval.
In general, the reference range of glycated haemoglobin is about 4.9-5.2 for healthy young persons [16].

4. Triglycerides and Total Cholesterol

Figure 3:
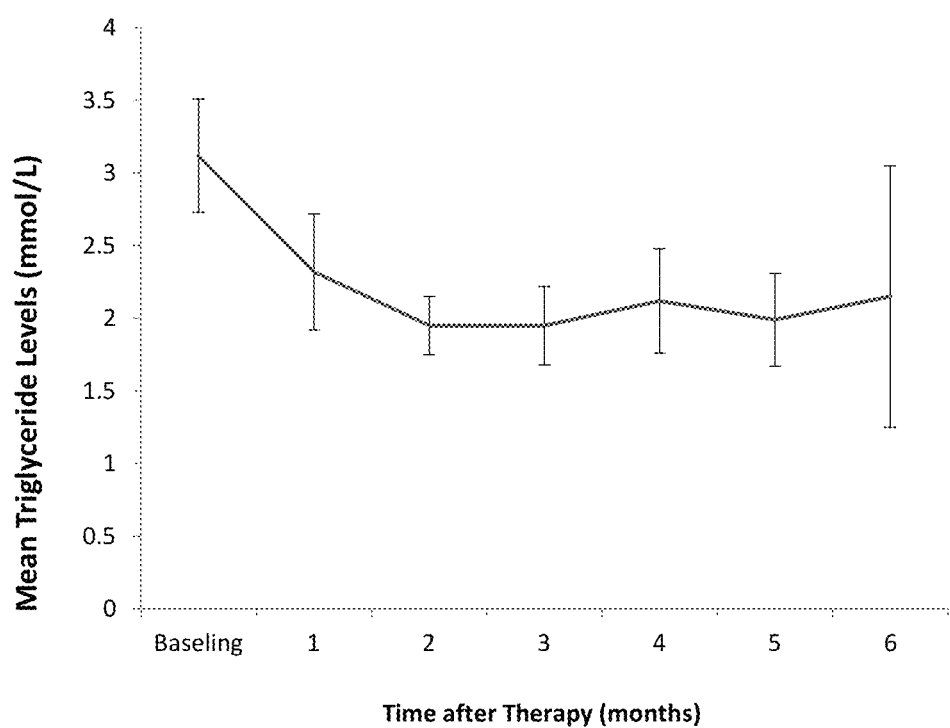
FIG. 3 is a plot of data that shows the baseline of, and changes to, mean triglycerides before and after therapy.
Figure 4A:
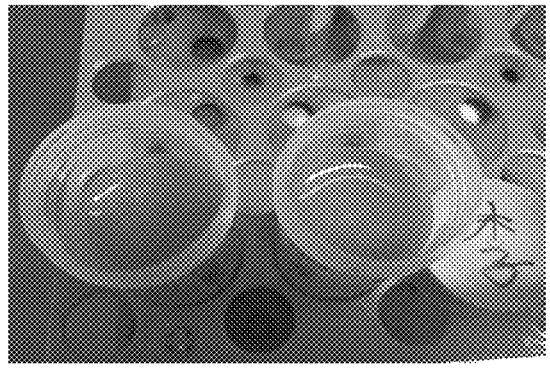
Figure 4B:
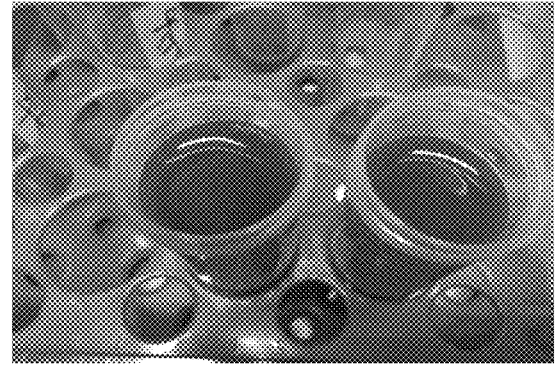
Figure 4C:
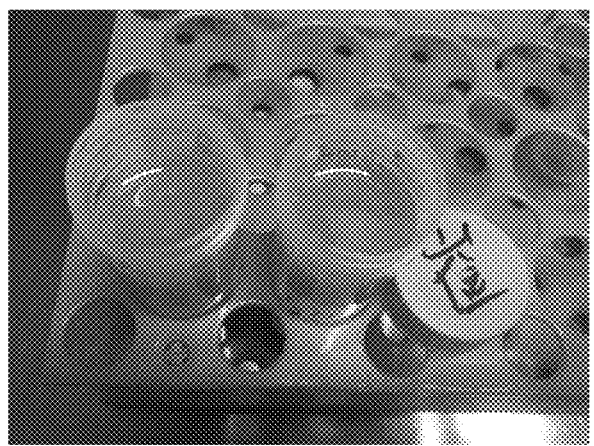
Figure 4D:
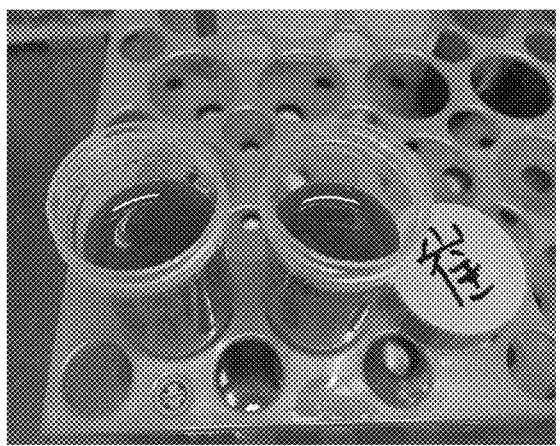

Among the ten patients who initially had hypertriglyceridemia, the mean baseline of pre-therapy plasma triglycerides was 3.12±1.24 mmol/L. The mean reductions post-therapy were 0.79±1.03 mmol/L, 1.17±1.06 mmol/L, 1.00±1.00 mmol/L, 1.13±0.89, 0.97±0.99, and 0.56±2.53 mmol/L assessed monthly for 6 months, respectively. FIG. 2 shows the changes and the statistics of actual mean values of the mean triglyceride levels before and after therapy. There were no significant changes from the baseline in total cholesterol levels following therapy, as shown in FIG. 3 and Table 3.

TABLE 3

Total cholesterol levels resulting from treatment

| | Baseline | Months after therapy | | | | | |
| --- | --- | --- | --- | --- | --- | --- | --- |
| | | 1 | 2 | 3 | 4 | 5 | 6 |
| Mean (mmol/L) | 3.12 | 2.32 | 1.95 | 1.95 | 2.12 | 1.99 | 2.15 |
| S.E.M. | 0.393 | 0.395 | 0.199 | 0.274 | 0.362 | 0.315 | 0.897 |
| Lower 95% CI | 2.23 | 1.43 | 1.50 | 1.50 | 1.17 | 1.44 | 0.52 |
| Upper 95% CI | 4.00 | 3.21 | 2.40 | 2.74 | 2.80 | 2.86 | 4.58 |
| P | | 0.038 | 0.007 | 0.012 | 0.003 | 0.013 | 0.501 |

S.E.M. = Standard Error of the Mean.
CI = Confidence Interval.
American Heart Association recommends an optimal triglyceride level of 1.1 mmol/L or lower.

5. Diabetic Symptoms and Some Physical Observations

Among the 12 patients who initially reported blurred vision, ten (83%) reported significant improvements following therapy. Among the ten patients who initially reported frequent trips to the bathroom, with a mean of 2.4±0.52 trips per night, eight (80%) reported a reduction in trips by at least one per night, whereas among the 16 patients who initially reported unquenchable thirst, 12 (75%) reported improvements during and after therapy, with varied degrees and durations, which were mostly in parallel with the reduction in blood glucose levels. Of the 25 patients, 20 (80%) reported significant improvements in appetite, sleep, and energy levels during and after therapy. A slight decrease in skin pigmentation was observed in all patients.

6. Changes in Plasma Appearance

During the study, it was observed that the freshly isolated plasma from patients who initially reported hyperlipidaemia looked fatty and cloudy, and that plasma from the same patients looked significantly less so mostly concurrent with reductions in glucose and triglyceride levels. The changes in plasma transparency and cloudiness were easily distinguished by visual examination and were observed in all ten patients who had initially reported hyperlipidaemia. FIGS. 4A-4H shows this change in plasma appearance for 4 patients with hyperlipidaemia: Fifty millilitres of venous blood from patients was separated by Ficoll-Hypaque centrifugation into plasma (top portion of tubes), white blood cells (at the interface), and red blood cells (bottom of tube). Photographs were made of the plasma as isolated during cell processing of the first dose (pre-treatment photographs) and the final cell infusions (after-treatment photographs).

7. Materials and Methods

The trial was performed in two hospitals in China, and was a single-arm trial performed in an outpatient setting. The study was approved by the institutional review board at each hospital, and all patients provided written informed consent.

8. Patients

To be eligible for participation in the trial, patients were required to meet all of the following criteria: ≥25 years of age; self-reported type 2 diabetes as verified by the use of glucose-lowering medication, physician report, or glucose levels; and a glycated-haemoglobin level ≥6.5%. Patients with any of the following factors were excluded: history of malignancy, active infections, seropositivity for human immunodeficiency virus infection, history of myocardial infarction or unstable angina in the previous 3 months, or currently pregnant or nursing.

9. Preparation of Therapeutic Cells and Treatment

Fifty millilitres of venous blood from patients was separated into peripheral blood mononuclear cells (PBMCs) by Ficoll-Hypaque centrifugation. The PBMCs ($4 \times 10^6$/mL) were then cultured in Roswell Park Memorial Institute-1640 medium (RPMI-1640) supplemented with 10% foetal calf serum (FCS) under sterile conditions for two days in the presence of interleukin (IL)-2, granulocyte macrophage colony stimulating factor (GM-CSF), and the calcium ionophore A23187 at 200 ng/mL (Sigma-Aldrich, St. Louis, MO, USA). The concentrations of IL-2 and GM-CSF used in the cell culture were predetermined individually by cell-proliferation assay to determine maximal stimulating activity. Adherent cells were scraped from the plastic and harvested together with the nonadherent cells. The cells were then washed twice with saline prior to intravenous administration back into the patient. A total of eight infusions were administered to each patient within a period of 4 weeks.

10. Outcomes and Assessments

The primary outcome involved changes from baseline of glycated haemoglobin that was monitored monthly for 6 months following completion of treatment. Other pre-specified outcomes included changes from baseline in total cholesterol and triglyceride levels in patients who initially had hypertriglyceridemia and hypercholesterolemia. Diabetes-related symptoms of blurred vision, frequent trips to the bathroom at night, and unquenchable thirst were also monitored as pre-specified outcomes.

All baselines were assessed 1 week prior to the first cell infusion, and all outcomes were assessed monthly for 6 months following the final cell infusion.

Example 2: RNA-Seq Analysis

1. Differentially Expressed Genes (DEGs) and Subsequent Analyses 291 genes were identified as differentially expressed with p value ≤0.05 as a result of the immunotherapy. Of these, 141 genes were up-regulated and 150 genes down-regulated.

To gain biological understanding of the DEGs, functional and pathway analyses were conducted using WebGetalt 2017 toolkit offered by WebGestalt online service (http://bioinfo.vanderbilt.edu/webgestalt/).

Of 291 DEGs, 188 unique genes were unambiguously mapped to the unique genes of the reference genome database of Ensembl, whereas 103 genes were mapped to multiple genes or could not mapped to any gene. The reference genome database contains 47989 genes and 2664 genes are annotated to selected functional categories that are used as the reference for the enrichment analysis. Gene ontology (GO), Kyoto Encyclopedia of Genes and Genome (KEGG) analyses were based on upon the 188 unique genes identified by the mapping.

2. GO Enrichment Analysis

Among the 188 unique DEGs, 129 were annotated to the selected functional categories and also in the reference gene list, which were used for the enrichment analysis. In the biological process categories, these DEGs were mostly related to biological regulation (88 genes), metabolic process (76 genes), response to stimulus (71 genes), multicellular organismal process (55 genes), localization (51 genes), cell communication (50 genes), developmental process (44 genes), cellular component organization (35 genes), cell proliferation (18 genes), multi-organism process (17 genes), reproduction (9 genes) and growth (3 genes). 76 genes were closely related to the metabolic process that was the second most abundant category after biological regulation.

On top of the cellular component categories were membrane (79 genes), nucleus (37 genes), vesicle (36 genes), endomembrane system (0.32 genes), macromolecular complex (26 genes), extracellular space (25 genes) and membrane-enclosed lumen (16 genes).

In the molecular function categories, protein binding (56 genes), ion binding (41 genes), hydrolase activity (21 genes), nucleic acid binding (20 genes) and transporter activity (17 genes) were most abundant. It is worth noting that 21 genes were related to hydrolase activity in agreement with the results of biological process analysis.

Figure 5A:
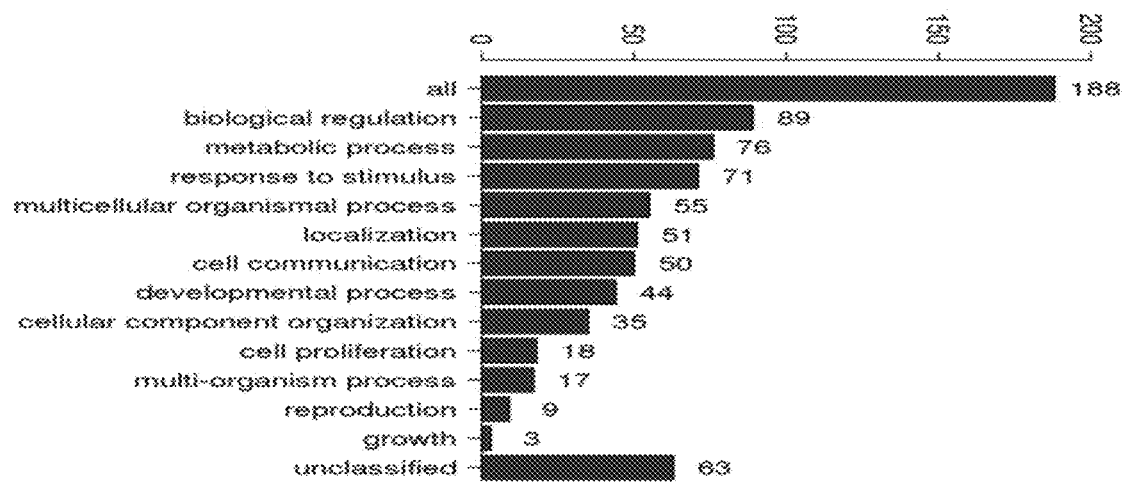
FIGS. 5A-5C are plots of data that provide a summary of GO enrichment analysis on differentially expressed genes (DEGs).
Figure 5B:
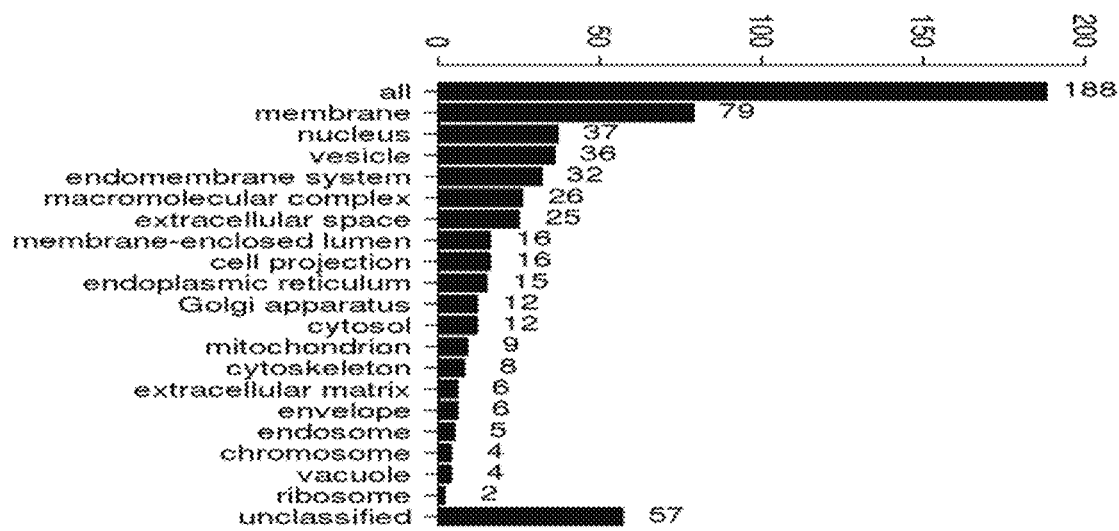
Figure 5C:
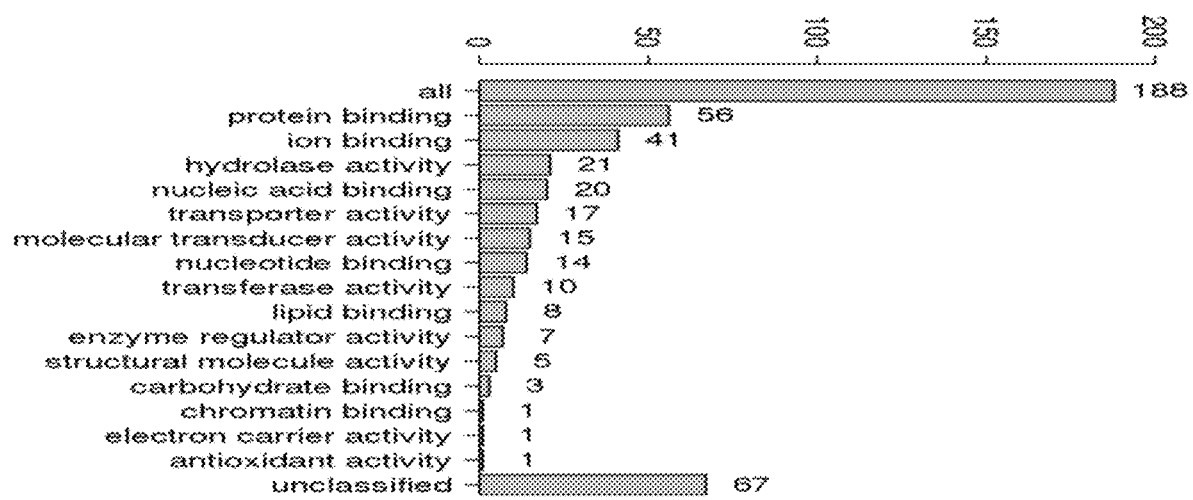

The summary of the GO enrichment analysis is shown in FIGS. 5A-5C.

3. KEGG Pathway Enrichment Analysis

KEGG pathways enrichment analysis were also conducted based on the 188 DEGs that were unambiguously mapped to the unique genes of the reference genome database. Of these 188 genes, 83 genes were annotated to the selected functional categories and also in the reference list, which are used for the enrichment analysis. Top 10 enriched categories from the 83 DEGs were gastric acid secretion, adipocytokine signalling pathway, fat digestion and absorption, salivary secretion, ABC transporters, hematopoietic cell lineage, glucagon signalling pathway, histidine metabolism, phototransduction and renin secretion. Similar to the GO analysis, 5 of 10 the enriched categories were directly related to energy metabolism. The enrichment categories and the genes identified in these categories are summarized in Table 4. The genes and gene symbols are known to artisans.

TABLE 4

Top ten enriched pathways of KEGG analysis

| ID | Name | #Genes | Gene Symbol | Gene Name | FDR |
|---|---|---|---|---|---|
| mo04971 | Gastric acid secretion | 5 | 1) Gast | Gastrin | 2.9e-01 |
| | | | 2) Itpr 3 | Inosito 1,4,5-trisphosphate receptor, type 3 | |
| | | | 3) Cckbr | Cholecystokinin B receptor | |
| | | | 4) Calml3 | Calmodulin-like 3 | |
| | | | 5) Sstr 2 | somatostatin receptor 2 | |
| mo04920 | Adipocytokine signalling pathway | 4 | 1) Pomc | Proopiomelanocortin | 5.82.e-01 |
| | | | 2) Nfkbie | NFKB inhibitor epsilon | |
| | | | 3) RGD 1565355 | Similar to fatty acid translocase/CD36 | |
| | | | 4) Camkk 2 | Calcium/calmodulin-dependent protein kinase kinase 2 | |
| mo04975 | Fat digestion and absorption | 3 | 1) Pla2g 16 | Phospholipase A2 group 1B | 5.82.e-01 |
| | | | 2) RGD 1565355 | Similar to fatty acid translocase/CD 36 | |
| | | | 3) Pnliprp1 | Pancreatic lipase-related protein1 | |
| mo04970 | Salivary secretion | 4 | 1) Aqp5 | Aquaporin 5 | 5.82.e-01 |
| | | | 2) Itpr3 | Inositol 1,4,5-trisphosphate receptor, type 3 | |
| | | | 3) Prpmp5 | Proline-rich protein MP5 | |
| | | | 4) Calml3 | Calmodulin-like 3 | |

TABLE 4-continued

Top ten enriched pathways of KEGG analysis

| ID | Name | #Genes | Gene Symbol | Gene Name | FDR |
|---|---|---|---|---|---|
| mo02010 | ABC transporters | 3 | 1) Tap1 | Transporter 1, ATP bingding cassette subfamily B member | 7.14e–01 |
| | | | 2) Abcg4 | ATP-binding cassette subfamily G member 4 | |
| | | | 3) Abcg2 | ATP-binding cassette, subfamily G (WHITE) member 2 | |
| mo04640 | Hematopoietic cell lineage | 4 | 1) Il1r2 | Interleukin 1 receptor type 2 | 7.14e–01 |
| | | | 2) Cd7 | CD 7 molecule | |
| | | | 3) RGD 1565355 | Similar to fatty acid translocase/CD36 | |
| | | | 4) Cd33 | CD22 molecule | |
| mo04922 | Glucagon signalling pathway | 4 | 1) Ldha | Lactate dehydrogenase A | 8.54e–01 |
| | | | 2) Itrp3 | Inositol 1,4,5-trisphosphate receptor, type 3 | |
| | | | 3) Calml3 | Calmodulin-like 3 | |
| | | | 4) Foxo1 | Forkhead box O1 | |
| mo00340 | Histidinge metabolism | 2 | 1) Aldh3a1 | Aldehyde dehydrogenase 3 family, member A1 | 8.45e–01 |
| | | | 2) Aldh1b1 | Aldehyde dehydrogenase 3 family, member B1 | |
| mo04744 | Phototransduction | 2 | Calml3 | Calmodulin-like 3 | 8.45e–01 |
| | | | Cngb1 | Cyclic nucleotide gated channel ☐☐☐ | |
| mo04924 | Renin secretion | 3 | 1) Agt | Angiotensinogen | 8.45e–01 |
| | | | 2) Itrp3 | Inositol 1,4,5-trisphosphate receptor, type 3 | |
| | | | 3) Calml3 | Calmodulin-like 3 | |

4. qPCR

Figure 6:
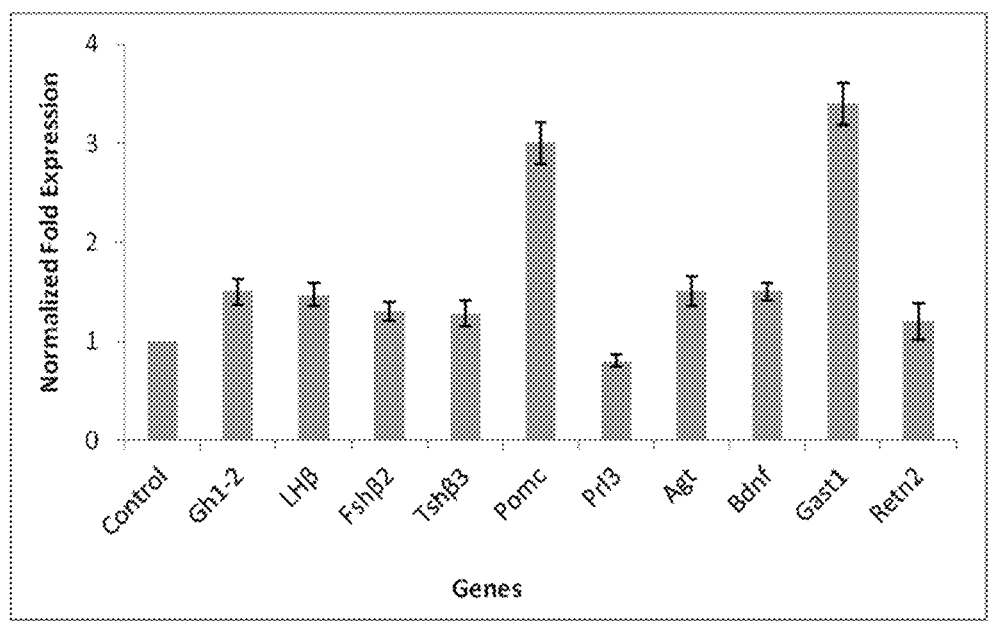
FIG. 6 is a result of a qPCR analysis for genes of pituitary gland hormones and selected genes.

To validate the RNA-Seq results, subunits of 6 genes coding for hormones of pituitary gland, namely thyroid stimulating hormone (tshβ3-3), follicle stimulating hormone (fshβ-2), luteinizing hormone (lhβ-1), proopiomelnocortin (pomc-1), growth hormone (ghl-2) and prolactin (prl-3) were selected for qPCR analysis. DEGs of angiotensinogen (agt-2), brain derived neurotropic factor (bdnf-1), gastrin (gast-1) and resistin (retn-2) were also selected for qPCR analysis because they have been extensively studied by other researchers and there is a wealth of literature describing their important biological functions. These DEGs were also identified by the GO and KEGG analyses of this study as enriched in the multiple categories.

qPCR analysis showed that prl was moderately decreased by 0.81 folds, whereas tshβ, fshβ, lhfβ, and ghl moderately increased by 1.26 to 1.50-folds, whereas pomc significantly increased by 3.1-folds. Pomc was also identified as a differentially expressed gene in the RNA-seq analysis. Results of qPCR and RNA-seq analyses for the expression of angiotensinogen (Agt) did not agree each other, in which a moderate increase with qPCR but a significant decrease with RNA-seq was shown, whereas qPCR analysis of bdnf, gast and retn showed increased expressions with varied degrees compared with those of controls. Results of qPCR analyses for six hormones of pituitary gland and selected genes are shown in FIG. 6.

Based on the qPCR and RNA-seq results, it was concluded that the immunotherapy method induced significant changes of transcriptome in the pituitary gland of normal rats and these changes contributed to the favourable results reported herein for type 2 diabetic patients and other patients.

5. Sample Preparation, RNA-Seq and qRT-PCR

Female Sprague Dawley rats (Guangdong Medical Laboratory Animal Center, Guangzhou, China) were 160-170 g on arrival. Rats were divided into control and treatment groups with 10 rats for each. The therapeutic cells were intravenously injected (tail injection) at dose of $1 \times 10^6$ cells per rat and total 4 injections were performed 2 days apart, while control rats were injected with saline.

Animals were killed via cervical dislocation, the pituitary glands quickly removed on ice. Tissue was snap-frozen in liquid nitrogen and stored at −80° C. until processing. RNA was extracted using the RNEASY MINI Kit (Qiagen, Switzerland) and DNaseI treatment was performed prior to RNA-Seq and qPCR to ensure no carry-over of genomic DNA. DNaseI-digested RNA was purified using Phenol: Chloroform according to the standard protocols. RNA was checked for concentration and purity in a BIOANALYZER (Agilent, Santa Clara, CA). Reverse transcription was carried out using Superscript III RT (Invitrogen, Carlsbad, CA) according to the manufacturer's instructions. RNA sequencing was done on an Illumina HISEQ X TEN Platform. For qPCR, primers were designed with Invitrogen OLIGOPERFECT Designer and three pairs of primers for each gene were designed and optimized by real PCR runs. Primers suited for each gene sequence were made using standard techniques. qPCR was carried out using CFA90 TOUCH System (BioRad China).

6. Differentially Expressed Genes (DEGs) Analysis

All reads were aligned to the whole *Rattus norvegicus* genome (Ensembl genome database, Rnor_6.0) using TOPHAT (version 2.0.6) with default options. CUFFLINKS (version 2.0.2) was used to estimate fragments per kilobase of exon per million fragments mapped (FPKM) values, and genes with an FPKM value ≥3 were considered being expressed. Raw counts were extracted from the samples of two groups of rats and the CUFFDIFF package was employed to find the differentially expressed genes at p-value≤0.05.

7. Pathway Enrichment Analysis and Disease Association Analysis

To gain biological understanding of those gene sets statistically significantly associated with the immunotherapy method, pathway enrichment analysis was carried out using WEBGETALT tool kit offered by WebGestalt online service (http://bioinfo.vanderbilt.edu/webgestalt/). Two types of pathway enrichment analyses were conducted for genes of significant gene sets: GO analysis and KEGG analysis. GO analysis is to find which GO terms are over-represented in a gene set based on the functional annotation of genes.

KEGG analysis is to discover pathways enriched in genes in a gene set against KEGG database (http://www.genome.jp/kegg/pathway.html). The default values for parameters in WebGestalt were adopted when performing pathway enrichment analysis.

8. Statistical Analysis

All statistical analyses except RNA-seq were performed using GraphPad PRISM software (v7.0; GraphPad Software, La Jolla, CA, USA). Analysis of differences between two groups was assessed by paired t test. Data were presented as the mean±standard error of the mean, and all p-values were two-sided, with a p<0.05 indicating statistical significance.

Example 3: Hypothyroidism

A female patient, 54 years old, was diagnosed with hypothyroidism 5 years prior to treatment with the cell therapy. Prior to the cell therapy, the patient complained of severe tiredness, constipation and back pain due to osteoarthritis, dry skin and slowed heart rate. Despite the fact that the patient had taken medications for the past 5 years, the symptoms had persisted and been increasingly getting worse. Cell infusions as described in Example 1 were prepared and given in 16 doses to the patient and all hypothyroidism-associated symptoms were observed to be gone as a result. For a first set of doses, blood was drawn on day 1 and a dose of cells was administered on days 3, 5, 7, 9, 11, 13, 15, and 17 to thereby administer 8 doses over 15 days. Two months later, a second set of doses were administered with blood being drawn on day 1 and 8 doses being administered every other day starting two days later to provide 8 doses over 15 days. Laboratory tests one week before the cell therapy showed a very low level of TSH. After a total of 16 cell infusions were given to the patient, all the symptoms were completely gone two weeks after the therapy. The laboratory tests two weeks after the completion of the cell therapy showed that TSH was significantly increased within the normal range, and anti-thyroid globulin antibodies were also significantly improved. The results of laboratory tests before and after the cell therapy is shown in Table 5 below. The patient has not needed to take medications after the cell therapy, has not experienced disease relapse, and laboratory tests show that hormones and thyroxines remain within the normal levels.

TABLE 5

| | TSH (mIU/L) | T3 (nmol/L) | FT3 (pmol/L) | T4 (nmol/L) | FT4 (pmol/L) | A-TG (U/mL) |
|---|---|---|---|---|---|---|
| Before | 0.038 | 1.43 | 4.49 | 137.8 | 19.1 | 664.7 |
| After | 1.32 | 1.66 | 4.10 | 127.1 | 17.6 | 45.3 |

(TSH: thyroid stimulating hormone; T3: Triiodothyronine; FT3: Free Triiodothyronine; A-TG; T4: triiodothyronine 4: Anti-thyroid globulin antibody).

Example 4: Infertility

One female and four male patients with infertility were treated with the cell therapy and a total of 8 cell infusions were given to each patient. Blood was drawn on day 1, the cells were cultured, and 8 doses of the cells were administered every other day starting in day 3 to provide 8 doses over 15 days. Semen analysis prior to the therapy showed varied degrees of sperm impairments among the four male patients as shown in the Table below and the female patient was at age 46, relatively old for reproduction. The partners of three male patients out of four became pregnant within 3 months after the cell therapy and subsequently gave birth to three healthy babies, whereas the female patient became pregnant 2 months after therapy but miscarried after 3 months of pregnancy. It was noted that the female's TSH secretion was significantly increased after the cell therapy compared with that before the therapy shown in the Figure below. Another male patient failed to conceive. Notably, all four male patients reported significantly increased libido due to the therapy.

TABLE 6

Semen Analysis of Four Male Patients with Infertility before therapy

| | Patient No. | | | |
|---|---|---|---|---|
| | 1 | 2 | 3 | 4 |
| Age | 27 | 39 | 36 | 42 |
| Volume (mL) | 4.0 | 3.1 | 5.7 | 1.0 |
| Liquefaction Time (min) | 30 | 10 | 12 | 30 |
| Count ($10^9$/L) | 18 | 39 | 133 | 8.0 |
| Viability (%) | 60 | 46 | 66 | 20 |
| Motility (%) | | | | |
| Grade a (fast forward) | 10 | 13 | 30 | 0 |
| Grade b (slow forward) | 20 | 5 | 33 | 5.0 |
| Grade c (not forward) | 30 | 28 | 2 | 15 |
| Grade d (no movement) | 40 | 54 | 35 | 80 |

Example 5: Osteoarthritis

Three female patients diagnosed with osteoarthritis had history of severe joint pain of both knees before the cell therapy. Each patient received a total of 8 cell infusions. Blood was drawn on day 1, the cells were cultured, and 8 doses of the cells were administered every other day starting in day 3 to provide 8 doses over 15 days. Each cell infusion contained ex vivo cultured activated cells from 50 mL of peripheral blood. Patients 1 and 3 were treated with autologous cells only, while patient 2 was with both autologous and allogeneic cells interchangeably. Visual Analogue Scale (VAS) method was used to measure the degree of the pain and measurements were carried out one week before and two weeks after the completion of the cell therapy to determine the effects of the cell therapy. It was found that the pains of the knees were significantly relieved in these three patients because of the cell therapy as shown in Table 7 below.

TABLE 7

Effects of the Cell Therapy on Pain Relief in Patients with Osteoarthritis

| Patient No. | Age | VAS Before | VAS After |
|---|---|---|---|
| 1 | 50 | 7 | 2 |
| 2 | 74 | 9 | 3 |
| 3 | 80 | 9 | 3 |

Example 6: Polycystic Ovary Syndrome

A patient of 31 years old had been diagnosed with polycystic ovary syndrome for ten years. She had infrequent, prolonged menstrual cycles and the last two periods prior to the therapy were 90 days apart. Ultrasound examination indicated that there were multiple cysts on both ovaries. The hormone examination showed that the ratio of Luteinizing (LH) hormone and follicle-stimulating hormone (FSH) was 3.77. The patient received a total of 25 cell infusions (doses) of the treatment. The patient was given 10 cell infusions within 4 weeks. Eight weeks after the last infusion, the patient received second set of 7 doses given every other day. Five weeks after the second treatment, the patient received final set of 8 doses given every another day. This patient was observed to be a slow responder to the cell therapy possibly due to a slow hypothalamus, as shown by a much slower than normal development of side effects of chills and fever, in response to the cell therapy. Hypothalamus controls body temperature and a patient should normally develop transient chills and fever in response to the cell therapy if it is effective. In this case, more cell infusions were provided over time in order to stimulate the hypothalamus. The first period after the therapy came 60 days from previous one. The ratio of LH and FSH after the therapy was reduced to 1.18, indicating improvement. The results of hormone examinations before and after therapy are shown in Table 8 below.

TABLE 8

| Hormone | Before | After |
|---|---|---|
| E2 (pg/ml) | 205 | 517 |
| LH (mIU/ml) | 22.22 | 23.79 |
| FSH mIU/ml) | 5.90 | 20.17 |
| LH/FSH | 3.77 | 1.18 |
| PRL (ng/ml) | 712 | 517 |
| T (ng/ml) | 1.57 | 1.07 |

E2 is estradiol,
PRL is prolactin, and
T is testosterone.

Example 7: Parkinson's Disease

A female patient at age 63 was newly diagnosed with Parkinson's disease. Her main symptoms were slowness of movement, rigidity and postural instability. The patient received treatment of 8 cell infusions two days apart. A simple Purdue Peg Board Dexterity Test was performed by the patient using both hands before and after the cell therapy. There are 25 holes on the board and time required for the patient to place pegs into all of the holes was recorded. An unimpaired normal person with similar age also performed the same task as control. The results of the test are shown in the Table below. The patient also reported significant improvements in the symptoms of slow movement, rigidity and postural instability.

TABLE 9

Results of Purdue Peg Board Dexterity Test (Seconds)

| | Patient | | Unimpaired Control | |
|---|---|---|---|---|
| | Before | After | Before | After |
| $1^{st}$ Try | 86 | 68 | 44 | 44 |
| $2^{nd}$ Try | 86 | 73 | 47 | 50 |
| $3^{rd}$ Try | 81 | 78 | 43 | 43 |
| Mean | 84 | 73 | 45 | 46 |

FURTHER DISCLOSURE AND DISCUSSION

This clinical study of Example 1 generated results indicating that the PBMC therapy helped control hyperglycaemia and hypertriglyceridemia in patients with type 2 diabetes. The results showed that blood glucose and triglyceride levels, but not total cholesterol levels, could simultaneously be lowered by immunotherapy treatment. Low-density and high-density lipoprotein cholesterol were also measured in addition to total cholesterol levels in some patients, but no significant changes were observed as a result of the therapy. It appeared that glucose and triglyceride levels were more metabolically interconnected and utilized similar metabolic pathways independent of cholesterol. The observation of this study that the activated, cultured PBMCs significantly reduced the high plasma viscosity in patients with type 2 diabetes was unpredicted and remarkable. The observed reduction of triglycerides by the therapy may not fully explain the observation that other lipids contributing to the high plasma viscosity were also significantly reduced. Notably, nine out of ten patients reporting pre-therapy blurred vision improved at least temporarily due to the therapy.

The results of this study indicated that the therapy method employed here were effective to treat type 2 diabetes mellitus, and that treatments could be repeated as needed for continued amelioration of disease symptoms at such time as the improvements caused by the treatment were decreased.

Throughout the study, type 2 diabetes and treatment with oral antihyperglycaemia medication were two factors affecting immune-cell activation in the PBMCs in vitro and subsequent immune responses in vitro. Healthy immune cells in the PBMCs should actively respond to stimuli and subsequently form large cell aggregates in cell culture. Similarly, the infusion of activated immune cells in the PBMCs should induce a certain degree of symptomatic responses in recipients. However, in this study, formation of cell aggregates or infusion-related symptoms was seldom observed in patients with relatively severe diabetes or who had taken antihyperglycaemia medication. These patients gradually developed symptomatic side effects, including chills and fever, concomitant with improvements in the disease; however, about 20% of patients never exhibited any therapy induced side effects throughout the study, indicating that the therapy may not have reached its full effectiveness in these patients.

The cell culture method was adapted from the processes of cell culture developed for treatment of AA as described in U.S. Pat. No. 7,332,158 based on a hypothesis at the time that some ex vivo-activated immune cells could travel to bone marrow to provide hematopoietic stem cells with the necessary growth factors and cell contact to enable their growth and differentiation. But results herein were suggestive that, in the context of type 2 diabetes mellitus, the activated cells herein may affect command centers in the human brain, including hypothalamus-pituitary axes, and the activated PBMCs might play a previously unidentified, but positive bridging role between peripheral immune system and brain. Successful treatment of further patients for conditions that are implicated in dysregulation of the hypothalamus-pituitary axis further supports this understanding.

To test this theory, pituitary glands of normal rats were investigated in response to the cultured PBMC therapy method, as described in detail in Example 2. Pituitary gland was chosen because hypothalamus-pituitary axis is integral in the regulation of neuroendocrine homeostasis including energy expenditure through its control of basal metabolic rate. Moreover, pituitary gland produces six hormones essential for a broad spectrum of neuroendocrine activities. In general it was useful for treatment of type 2 diabetes, as compared to treatment of AA, it to administer more cells per treatment and to treat the patients with additional administrations of the cells to patients over a longer period of time to obtain preferred levels of a response as measurable by lower blood sugar and glycated haemoglobin levels.

In RNA-seq analysis, significant changes of transcriptome in the pituitary glands of rats were observed and 291 DEGs were identified as a result of the therapy with the activated cells. The results of GO and KEGG analyses of these DEGs were found to be heavily annotated to metabolism to a remarkable degree. The exact molecular mechanism of the effects of the immunotherapy method on the brain needs to be further studied in the future.

The results of qPCR and RNA-seq for DEGs of bdnf, gast and retn agreed well, whereas those of agt did not. Bdnf is a neurotrophin and has been reported to have many activities inside central nervous system, and to influence systemic or peripheral conditions, such as acute coronary syndrome and type 2 diabetes mellitus [17]. Bdnf is one of the key proteins in food intake regulation and body weight control and significantly related to the regulation of glucose levels [18]. Gastrins encoded by gene of gast are peptide hormones important for gastric acid secretion and growth of the gastrointestinal mucosa [19] and it has been reported that gastrin-deficient mice have disturbed hematopoiesis in response to iron deficiency [20]. This data may further understanding of the role that the central nervous system plays in hematopoiesis. The role of retn plays in the energy homeostasis has been disputed and it was called resistin because of observed insulin resistance in mice injected with resistin. The amount of evidence supporting the resistin link theory between obesity and type 2 diabetes is vast [21], nevertheless, this theory is not fully accepted in the scientific community, as the number of studies presenting evidence against it continues to expand [22]. The findings herein support the argument that resistin would help maintain energy homeostasis at least when expressed in brain.

Pomc was the gene of particular interest because it is believed by many to play a critical role in the hypothalamus responsible for food intake. The therapy method significantly increased expression of pomc in the pituitary gland, which were detected by both qPCR and RNA-seq, as a result of the immunotherapy. It would be reasonable to believe that the expression of pomc was also increased in the hypothalamus of rats in response to the therapy. Moreover, the observations of the therapy-induced slight dispigmentation of the skin, improved sleep, fever and chills in the diabetic patients of this study also indicated involvement of hypothalamus and pomc. These findings of this study supported the hypothalamo-centric theory for the energy homeostasis. The results of Example 1 indicate that the therapy method helps to control hyperglycaemia, hypertriglyceridemia, and diabetic symptoms in patients with type 2 diabetes mellitus. The results of RNA-seq and qPCR analyses in rats reported in Example 2 indicate that the PBMC therapy may significantly stimulate central nervous system and help maintain homeostasis in general and energy homeostasis in particular.

The treatment of hypothyroidism is described in Example 3. Ex vivo cultured activated PBMCs were administered to a patient exhibiting symptoms of hypothyroidism. A baseline taken before the treatment showed a low level of thyroid-stimulating hormone (TSH), about 0.04 IU. After treatment, the patient's symptoms were decreased and tests for TSH and other hormones and thyroxines were within normal levels. The treatment restored homeostasis to TSH and other pertinent biomarkers. These methods can similarly be used to treat hyperthyroidism, which is similarly linked to a lack of homeostasis.

Figure 7:
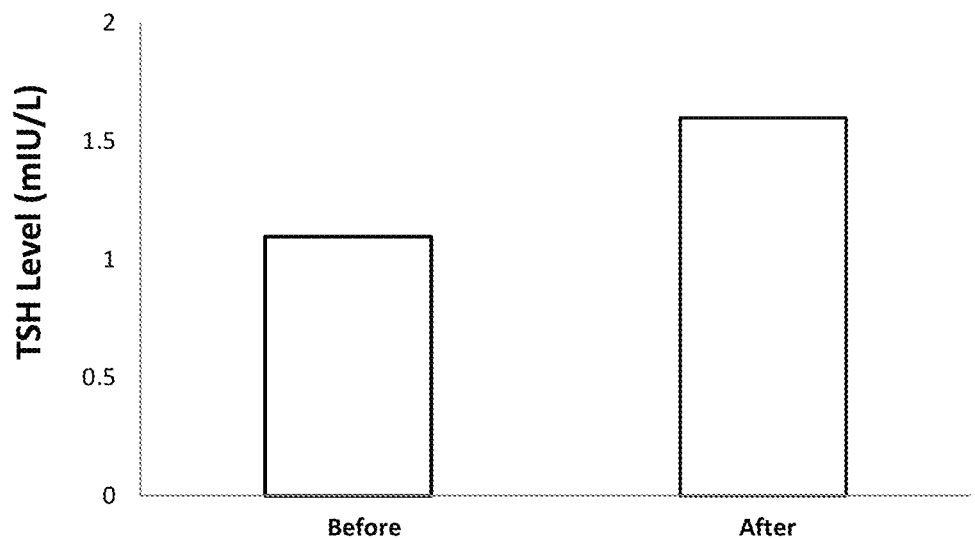
FIG. 7 is a graph of data presenting TSH levels of a patient before and after therapy.

The treatment of infertility is described in Example 4. Ex vivo cultured activated PBMCs were administered to male and female patients exhibiting a lack of fertility. Four of the five patients successfully conceived after treatment. TSH levels were measured in the female patient and observed to increase after treatment, FIG. 7. It is believed that TSH levels in the male patients were also restored to homeostasis although TSH measurements are not reported.

Three patients with osteoarthritis were treated as describe in Example 5. Two patients were treated with autologous activated PBMCs and one patient was treated with allogeneic cells. After 8 infusions of PBMCs, all the patients had a lessening of symptoms and an isual Analogue Scale (VAS) method measurement of knee pain showed significant improvement from an average of 8.3 to an average of 2.6. A patient had long-term polycystic ovary syndrome had a pretreatment ratio of Luteinizing (LH) hormone and follicle-stimulating hormone (FSH) of 3.77; levels of more than 2 are indicative of polycystic ovary syndrome. As reported in Example 6, the ratio of LH and FSH after the therapy was reduced by a factor of 3, to 1.18, indicating improvement.

A female patient at age 63 with Parkinson's disease had symptoms of slowness of movement, rigidity and postural instability. The patient received autologous activated PBMC treatment. After treatment, the patient's average score of 84 on the Purdue Peg Board Dexterity Test was reduced to 73. A control scored an average of 45 on the test. The patient also reported significant improvements in the symptoms of slow movement, rigidity and postural instability.

FURTHER DISCLOSURE

Various embodiments of the invention are set forth as follows. 1. A method of treating a patient with type 2 diabetes mellitus, metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease, or combinations thereof comprising administering a therapeutically effective amount of ex vivo cultured activated peripheral blood mononuclear cells (PBMCs) to a patient with type 2 diabetes mellitus, metabolic syndrome, obesity, infertility, high blood pressure, hyperthyroidism, hypothyroidism, hyperlipidemia, osteoporosis, osteoarthritis, hypoadrenalism, polycystic ovary syndrome, or Parkinson's disease, wherein the ex vivo cultured activated cells are autologous or allogeneic relative to the patient and are activated and cultured in a presence of a cytokine. 2. The method of 1 wherein the cytokine is selected from the group consisting of Interleukin-2 (IL-2), granulocyte-macrophage colony stimulating factor (GM-CSF), and combinations thereof. 3. The method of 1 or 2 wherein the patient has type 2 diabetes mellitus and administering of the PBMCs reduces a glycated haemoglobin level of the patient, relative to a baseline established prior to the administration. 4. The method of any of 1-3 wherein the patient has type 2 diabetes mellitus and the administering of the PBMCs reduces a triglyceride level of the patient, relative to a baseline established prior to the administration. 5. The method of any of 1-4 wherein the patient has type 2 diabetes mellitus and further comprising testing a glycaemic level in the patent before or after the administration of the PBMCs. 6. The method of any of 1-5 wherein the patient has type 2 diabetes mellitus and further comprising assessing the patient before administration of the PBMCs to determine that the patient has diabetes 2 mellitus. 7. The method of any of 1-6 wherein the patient has type 2 diabetes mellitus and further comprising establishing a baseline glycaemic level and/or glycated haemoglobin level before administration of the PBMCs. 8. The method of any of 1-7 wherein the patient has type 2 diabetes mellitus and further comprising measuring a glycated haemoglobin level of the patient before or after administration of the PBMCs. 9. The method of any of 1-8 wherein the patient has type 2 diabetes mellitus and further comprising measuring a triglyceride level and/or a cholesterol level of the patient after administration of the PBMCs. 10. The method of any of 1-9 wherein the patient has type 2 diabetes mellitus and the glycated haemoglobin level decreases relative to a pretreatment level after the administration of the PBMCs and further comprising repeating the administration of PBMCs after a subsequent increase in the glycated haemoglobin level. 11. The method of 1 or 2 wherein a TSH level of the patient is returned to normal levels after the treatment or wherein a TSH level of the patient is returned to a level that is closer to normal relative to a baseline level of TSH. 12 The method of 1 or 2 wherein the patient has metabolic syndrome and/or obesity and the administering of the PBMCs reduces a symptom of metabolic syndrome and/or obesity relative to a baseline established prior to the administration. 13. The method of 1 or 2 wherein the patient has infertility and the administering of the PBMCs improves a measure of sperm health of the patient and/or a TSH level is increased, relative to a baseline established prior to the administration. 14. The method of 1 or 2 wherein the patient has high blood pressure and the administering of the PBMCs reduces the blood pressure of the patient, relative to a baseline established prior to the administration. 15. The method of 1 or 2 wherein the patient has hyperthyroidism or hypothyroidism and the administering of the PBMCs decreases or increase a TSH level, as appropriate, relative to a baseline established prior to the administration. 16. The method of 1 or 2 wherein the patient has hyperlipidemia, and the administering of the PBMCs reduces a lipid level (cholesterol and/or low-density lipoprotein (LDL) and/or triglyceride) relative to a baseline established prior to the administration. 17. The method of 1 or 2 wherein the patient has metabolic osteoporosis and/or osteoarthritis and the administering of the PBMCs reduces a symptom (pain, difficulty of movement, or other) of osteoporosis and/or osteoarthritis relative to a baseline established prior to the administration. 18. The method of 1 or 2 wherein the patient has hypoadrenalism and the administering of the PBMCs increases a level of steroid hormone (e.g., cortisol, aldosterone) of the patient, relative to a baseline established prior to the administration. 19. The method of 1 or 2 wherein the patient has polycystic ovary syndrome and the administering of the PBMCs improves a ratio of LH to FSH of the patient, relative to a baseline established prior to the administration. 19. The method of 1 or 2 wherein the patient has Parkinson's disease and the administering of the PBMCs improves a symptom of the patient (e.g., dexterity, slow movement, rigidity, postural instability) relative to a baseline established prior to the administration. 20. The method of any of 1-19 comprising isolating the PBMCs from blood of the patient. 21. The method of any of 1-20 further comprising determining a concentration of IL-2 and a concentration of GM-CSF to use in culture of the cells based on a proliferation assay for the PBMCs, wherein the PBMCs are cultured at the determined concentration of IL-2 and the determined concentration of the GM-CSF. 22. The method of any of 1-21 wherein the cultured activated cells are cultured in a medium that contains serum or are cultured under serum-free conditions. 23. The method of any of 1-22 further comprising repeating the administration of PBMCs. 24. The method of any of 1-21 wherein a dose of the PBMCs ranges from $1\times10^5$ to $2\times10^8$ cells. 25. The method of any of 1-24 further comprising administering 2-20 of the doses of PBMCs over a period of time ranging from 1-26 weeks. 26. The method of any of 1-25 wherein the PBMCs are cultured in a presence of a calcium ionophore. 27. Ex vivo cultured cells made for a use of any of 1-24. 28. The ex vivo cultured cells of 27 for use in a treatment of diabetes type 2, metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease. 29. The cells of 28 for use in treatment of concomitant medical conditions, including hypertriglyceridemia and/or hypercholesterolemia.

Further embodiments are as follows. 21. Ex vivo cultured activated blood cells for use in the treatment of type 2 diabetes mellitus, metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease, or a combination thereof, the ex vivo cultured blood cells being prepared by a process comprising culturing peripheral blood mononuclear cells (PBMCs) in a presence of a cytokine to activate the PBMCs and wherein the PBMCs are autologous for a patient to be treated. As an alternative, wherein the PBMCs are allogeneic relative to the patient being treated. 22. The blood cells for use of 21 wherein the cytokine is selected from the group consisting of Interleukin-2 (IL-2), granulocyte-macrophage colony stimulating factor (GM-CSF), and combinations thereof. 23. The blood cells for use of 21 or 22 wherein the process comprises isolating the PBMCs from blood of the patient. 24. The blood cells for use of any of 21-23 wherein the process comprises determining a concentration of IL-2 and a concentration of GM-CSF for the culturing of the PBMCs based on a proliferation assay for the PBMCs. 25. The blood cells for use of any of 21-24 wherein the cultured activated cells are cultured in a medium that contains serum or are cultured under serum-free conditions. 26. The blood cells for use of any of 21-25 wherein the cells are cultured in a presence of a calcium ionophore. 27. The blood cells for use of any of 21-26 wherein the treatment of the type 2 diabetes mellitus provides a decrease of a glycated haemoglobin level relative to a baseline. 28. The blood cells for use of any of 21-27 wherein the treatment of the type 2 diabetes mellitus provides a decrease of a triglyceride level of the patient, relative to a baseline. 29. The blood cells for use of any of 21-27 for a further use in concomitant medical conditions, including hypertriglyceridemia and/or hypercholesterolemia. 30. The blood cells for use of any of 21-26 wherein a TSH level of the patient is returned to normal levels after the treatment or wherein a TSH level of the patient is returned to a level that is closer to normal relative to a baseline level of TSH. 31. The blood cells for use of any of 21-26 wherein the treatment of metabolic syndrome and/or obesity reduces a symptom of metabolic syndrome and/or obesity relative to a baseline established prior to the administration. 31. The blood cells for use of any of 21-26 wherein the treatment of infertility improves a measure of sperm health of the patient and/or a TSH level is increased, relative to a baseline established prior to the administration. 32. The blood cells for use of any of 21-26 wherein the treatment of high blood pressure reduces the blood pressure of the patient, relative to a baseline established prior to the administration. 33. The blood cells for use of any of 21-26 wherein the treatment of hyperthyroidism or hypothyroidism decreases or increases a TSH level, as appropriate, relative to a baseline established prior to the administration. 34. The blood cells for use of any of 21-26 wherein the treatment of hyperlipidemia reduces a lipid level (cholesterol and/or low-density lipoprotein (LDL) and/or triglyceride) relative to a baseline established prior to the administration. 35. The blood cells for use of any of 21-26 wherein the treatment of osteoporosis and/or osteoarthritis reduces a symptom (pain, difficulty of movement, or other) of osteoporosis and/or osteoarthritis relative to a baseline established prior to the administration. 36. The blood cells for use of any of 21-26 wherein the treatment of hypoadrenalism increases a level of steroid hormone (e.g., cortisol, aldosterone) of the patient, relative to a baseline established prior to the administration. 37. The blood cells for use of any of 21-26 wherein the treatment of polycystic ovary syndrome improves a ratio of LH to FSH of the patient, relative to a baseline established prior to the administration. 38. The blood cells for use of any of 21-26 wherein the treatment of Parkinson's disease improves a symptom of the patient (e.g., dexterity, slow movement, rigidity, postural instability) relative to a baseline established prior to the administration 39. A method of making blood cells of any of 21-33, the method comprising any of 1-27.

Further embodiments are 40. A use of ex vivo cultured activated blood cells for manufacture of a medicament for treating type 2 diabetes mellitus, metabolic syndrome, obesity, infertility, high blood pressure, hyperthyroidism, hypothyroidism, hyperlipidemia, osteoporosis, osteoarthritis, hypoadrenalism, polycystic ovary syndrome, Parkinson's disease, or a combination thereof, the ex vivo cultured blood cells being prepared by a process comprising culturing peripheral blood mononuclear cells (PBMCs) in a presence of a cytokine to activate the PBMCs. 41. The use of 40 wherein the cytokine is selected from the group consisting of Interleukin-2 (IL-2), granulocyte-macrophage colony stimulating factor (GM-CSF), and combinations thereof. 42. The use of 40 or 41 wherein the process comprises isolating the PBMCs from blood of the patient. 43. The use of any of 40-42 wherein the process comprises determining a concentration of IL-2 and a concentration of GM-CSF for the culturing of the PBMCs based on a proliferation assay for the PBMCs. 44. The use of any of 40-43 wherein the cultured activated cells are cultured in a medium that contains serum or are cultured under serum-free conditions. 45. The use of any of 40-44 wherein the cells are cultured in a presence of a calcium ionophore. 46. The use of any of 40-45 wherein the treatment of the type 2 diabetes mellitus provides a decrease of a glycated haemoglobin level relative to a baseline. 47. The use of any of 40-46 wherein the treatment of the type 2 diabetes mellitus provides a decrease of a triglyceride level of the patient, relative to a baseline. 48. The use of any of 40-47 with a further use in concomitant medical conditions, including hypertriglyceridemia and/or hypercholesterolemia. 49. The use of any of 40-45 wherein the treatment of the patient for a TSH level dysregulation provides for a return to normal levels after the treatment or wherein a TSH level of the patient is returned to a level that is closer to normal relative to a baseline level of TSH. 50. The use of any of 40-45 wherein the treatment of metabolic syndrome and/or obesity reduces a symptom of metabolic syndrome and/or obesity relative to a baseline established prior to the administration. 51. The use of any of 40-45 wherein the treatment of infertility improves a measure of sperm health of the patient and/or a TSH level is increased, relative to a baseline established prior to the administration. 52. The use of any of 40-45 wherein the treatment of high blood pressure reduces the blood pressure of the patient, relative to a baseline established prior to the administration. 53. The use of any of 40-45 wherein the treatment of hyperthyroidism or hypothyroidism decreases or increases a TSH level, as appropriate, relative to a baseline established prior to the administration. 54. The use of any of 40-45 wherein the treatment of hyperlipidemia reduces a lipid level (cholesterol and/or low-density lipoprotein (LDL) and/or triglyceride) relative to a baseline established prior to the administration. 55. The use of any of 40-45 wherein the treatment of osteoporosis and/or osteoarthritis reduces a symptom (pain, difficulty of movement, or other) of osteoporosis and/or osteoarthritis relative to a baseline established prior to the administration. 56. The use of any of 40-45 wherein the treatment of hypoadrenalism increases a level of steroid hormone (e.g., cortisol, aldosterone) of the patient, relative to a baseline established prior to the administration. 57. The use of any of 40-45 wherein the treatment of polycystic ovary syndrome improves a ratio of LH to FSH of the patient, relative to a baseline established prior to the administration. 58. The use of any of 40-45 wherein the treatment of Parkinson's disease improves a symptom of the patient (e.g., dexterity, slow movement, rigidity, postural instability) relative to a baseline established prior to the administration 59. A method of making blood cells of any of 40-59, the method comprising any of 1-27.

All patent applications, patents, and publications set forth herein are hereby incorporated by reference herein; in case of conflict the specification is controlling.

REFERENCES

1. Thrasher. J. Pharmacologic management of type 2 diabetes mellitus: available therapies. *American J Cardiology* 120:S4-16 (2017)
2. Polonsky, K. The past 200 years in diabetes. *N Engl J Med* 367: 1332-1340 (2012).
3. Waugh, N. et al. Newer agents for blood glucose control in type 2 diabetes: systematic review and economic evaluation. *Health Technol Assess* 14:1-248 (2010).
4. Bastaki, S. Diabetes mellitus and its treatment. *Int J Diabetes & Metabolism* 13: 111-134 (2005).
5. Selvin E. et al. Meta-analysis: glycosylated haemoglobin and cardiovascular disease in diabetes mellitus. *Ann Intern Med* 141: 421-431 (2004).
6. Gerstein, H. et al. The relationship between dysglycaemia and cardiovascular and renal risk in diabetic and non-diabetic participants in the HOPE study: a prospective epidemiological analysis. *Diabetologia* 48: 1749-1755 (2005).

7. Stratton, I. et al. Association of glycaemia with macrovascular and microvascular complications of type 2 diabetes (UKPDS 35): prospective observational study. *BMJ* 321: 405-412 (2000).
8. Chahil, T. and Ginsberg, H. Diabetic dyslipidemia. *Endocrinol Metab Clin North Am* 35: 491-510 (2006).
9. Turner, R. et al. Risk factors for coronary artery disease in non-insulin dependent diabetes mellitus: United Kingdom Prospective Diabetes Study (UKPDS: 23). *BMJ* 316: 823-828 (1998).
10. Wang, C., Hess, C., Hiatt, W., Goldfine, A. Clinical update: cardiovascular disease in diabetes mellitus: atherosclerotic cardiovascular disease and heart failure in type 2 diabetes-mechanisms, management, and clinical considerations. *Circulation* 133:2459-2502 (2016).
11. Chen, J. et al. Ex vivo immunotherapy for patients with benzene-induced aplastic anaemia. *J Hematother Stem Cell Res* 12: 505-514 (2003).
12. Li, G. et al. Ex vivo activated immune cells promote survival and stimulate multilineage hematopoietic recovery in myelosuppressed mice. *J Immunother* 28: 420-425 (2005).
13. Chen, J. et al. A novel cell-based therapy for patients with aplastic anaemia. *Cytotherapy* 12: 678-683 (2010).
14. Waterson, M. and Horvath, Y. Neuronal regulation of energy homeostasis beyond the hypothalamus and feeding. *Cell Metab* 22:962-968 (2015)
15. Yeo, G. and Coll, A. The hypothalamus and metabolism: integrating signals to control energy and glucose homeostasis. *Curr. Opin. in Pharmacol.* 13:970-976 (2013).
16. Saaddine, J. et al. Distribution of HbA1c levels for children and young adults in the U.S.: third national health and nutrition examination survey. *Diabetes Care* 25:1326-1330 (2002).
17. Marosi, K. and Mattson M. BDNF mediates adaptive brain and body responses to energetic challenges. *Trends Endocrinol Metab* 25:89-98 (2014)
18. Eyileten, C., Kapion-Cieslicka, A., Mirowska-Guzel, D., Malek, L. and Postula M. Antidiabetic effect of brain-derived neurotrophic factor and its association with inflammation in type 2 diabetes mellitus. *J. Diabetes Research* 20:958-966 (2017).
19. Dockray, G., Dimaline, R., Varro, A. Gastrin: old hormone, new functions. *Pfluygers Arch* 449:344-355 (2005).
20. Kovac S. et al. Gastrin-deficient mice have disturbed hematopoiesis in response to iron deficiency. *Endocrinology* 152:3062-3073 (2011).
21. Abate, N. et al. Resistin: an inflammatory cytokine. Role in cardiovascular diseases, diabetes and the metabolic syndrome, *Current Pharm Des* 20:4961-4969 (2014).
22. Park, H. and Ahima R. Resistin in rodents and humans. *Diabetes Metab J.* 37:404-414 (2013).

The invention claimed is:

1. A method of treating a patient with osteoporosis, osteoarthritis, polycystic ovary syndrome, or Parkinson's disease, comprising administering a therapeutically effective amount of ex vivo cultured activated peripheral blood mononuclear cells (PBMCs) to a patient with osteoporosis, osteoarthritis, polycystic ovary syndrome, or Parkinson's disease wherein the ex vivo cultured activated cells are autologous to the patient and are activated and cultured in a presence of a cytokine, wherein the cytokine comprises a combination of Interleukin-2 (IL-2) and granulocyte-macrophage colony stimulating factor (GM-CSF); wherein a dose of the ex vivo cultured activated PBMCs ranges from $1 \times 10^5$ to $2 \times 10^8$ cells, and the method further comprising administering 2-20 of the doses of vivo cultured activated PBMCs over a period of time ranging from 1-26 weeks.

2. The method of claim 1 wherein the ex vivo cultured activated PBMCs are cultured in a medium that contains serum.

3. The method of claim 1 further comprising repeating the administering of the ex vivo cultured activated PBMCs.

4. The method of claim 1 wherein the ex vivo cultured activated PBMCs are cultured in a presence of a calcium ionophore.

5. The method of claim 1 wherein the ex vivo cultured activated PBMCs are cultured in a medium under serum-free conditions.

6. The method of claim 1 further comprising determining a concentration of the IL-2 and a concentration of the GM-CSF to use in culture of the ex vivo cultured activated PBMCs based on a proliferation assay for the PBMCs, wherein the PBMCs are cultured at the determined concentration of the IL-2 and the determined concentration of the GM-CSF.

* * * * *